(12) United States Patent
Burger et al.

(10) Patent No.: US 10,776,115 B2
(45) Date of Patent: Sep. 15, 2020

(54) DEBUG SUPPORT FOR BLOCK-BASED PROCESSOR

(71) Applicant: Microsoft Technology Licensing, LLC, Redmond, WA (US)

(72) Inventors: Douglas C. Burger, Bellevue, WA (US); Aaron L. Smith, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 516 days.

(21) Appl. No.: 14/942,557

(22) Filed: Nov. 16, 2015

(65) Prior Publication Data

US 2017/0083431 A1 Mar. 23, 2017

Related U.S. Application Data

(60) Provisional application No. 62/221,003, filed on Sep. 19, 2015.

(51) Int. Cl.
*G06F 9/30* (2018.01)
*G06F 9/38* (2018.01)
(Continued)

(52) U.S. Cl.
CPC .......... *G06F 9/3016* (2013.01); *G06F 9/268* (2013.01); *G06F 9/3004* (2013.01);
(Continued)

(58) Field of Classification Search
CPC .............. G06F 9/3836; G06F 9/30189; G06F 11/3656; G06F 9/3016
See application file for complete search history.

(56) References Cited

U.S. PATENT DOCUMENTS 5,247,628 A 9/1993 Grohoski
5,317,734 A 5/1994 Gupta
(Continued)

FOREIGN PATENT DOCUMENTS

EP 0992894 A1 4/2000
JP 2001175473 A 6/2001
(Continued)

OTHER PUBLICATIONS

Peter Jay Salzman & Norman Matloff, "The Art of Debugging with GDB and DDD," No Starch Press, 9, 2008, downloaded from https://learning.oreilly.corn/library/view/the-art-of/9781593271749/ on Dec. 25, 2018. (Year: 2008).*

(Continued)

*Primary Examiner* — Michael J Metzger
(74) *Attorney, Agent, or Firm* — Klarquist Sparkman, LLP

(57) ABSTRACT

Systems and methods are disclosed for supporting debugging of programs in block-based processor architectures. In one example of the disclosed technology, a processor includes a block-based processor core for executing an instruction block comprising an instruction header and a plurality of instructions. The block-based processor core includes execution control logic and core state access logic. The execution control logic can be configured to schedule respective instructions of the plurality of instructions for execution in a dynamic order during a default execution mode and to schedule the respective instructions for execution in a static order during a debug mode. The core state access logic can be configured to read intermediate states of the block-based processor core and to provide the intermediate states outside of the block-based processor core during the debug mode.

18 Claims, 13 Drawing Sheets

(51) Int. Cl.

| | | |
|---|---|---|
| *G06F 9/46* | (2006.01) | |
| *G06F 9/52* | (2006.01) | |
| *G06F 11/36* | (2006.01) | |
| *G06F 9/26* | (2006.01) | |
| *G06F 9/32* | (2018.01) | |
| *G06F 9/345* | (2018.01) | |
| *G06F 9/35* | (2018.01) | |
| *G06F 12/0806* | (2016.01) | |
| *G06F 12/0862* | (2016.01) | |
| *G06F 12/1009* | (2016.01) | |
| *G06F 13/42* | (2006.01) | |
| *G06F 15/80* | (2006.01) | |
| *G06F 15/78* | (2006.01) | |
| *G06F 9/355* | (2018.01) | |
| *G06F 12/0811* | (2016.01) | |
| *G06F 12/0875* | (2016.01) | |

(52) U.S. Cl.
CPC ........ *G06F 9/3005* (2013.01); *G06F 9/30007* (2013.01); *G06F 9/3009* (2013.01); *G06F 9/30021* (2013.01); *G06F 9/30036* (2013.01); *G06F 9/30043* (2013.01); *G06F 9/30047* (2013.01); *G06F 9/30058* (2013.01); *G06F 9/30072* (2013.01); *G06F 9/30076* (2013.01); *G06F 9/30087* (2013.01); *G06F 9/30098* (2013.01); *G06F 9/30101* (2013.01); *G06F 9/30105* (2013.01); *G06F 9/30138* (2013.01); *G06F 9/30145* (2013.01); *G06F 9/30167* (2013.01); *G06F 9/30189* (2013.01); *G06F 9/32* (2013.01); *G06F 9/345* (2013.01); *G06F 9/35* (2013.01); *G06F 9/3802* (2013.01); *G06F 9/383* (2013.01); *G06F 9/3804* (2013.01); *G06F 9/3822* (2013.01); *G06F 9/3824* (2013.01); *G06F 9/3828* (2013.01); *G06F 9/3836* (2013.01); *G06F 9/3838* (2013.01); *G06F 9/3842* (2013.01); *G06F 9/3848* (2013.01); *G06F 9/3851* (2013.01); *G06F 9/3853* (2013.01); *G06F 9/3855* (2013.01); *G06F 9/3859* (2013.01); *G06F 9/3867* (2013.01); *G06F 9/3891* (2013.01); *G06F 9/466* (2013.01); *G06F 9/528* (2013.01); *G06F 11/36* (2013.01); *G06F 11/3648* (2013.01); *G06F 11/3656* (2013.01); *G06F 12/0806* (2013.01); *G06F 12/0862* (2013.01); *G06F 12/1009* (2013.01); *G06F 13/4221* (2013.01); *G06F 15/80* (2013.01); *G06F 15/8007* (2013.01); *G06F 9/3013* (2013.01); *G06F 9/321* (2013.01); *G06F 9/355* (2013.01); *G06F 9/3557* (2013.01); *G06F 12/0811* (2013.01); *G06F 12/0875* (2013.01); *G06F 15/7867* (2013.01); *G06F 2212/452* (2013.01); *G06F 2212/602* (2013.01); *G06F 2212/604* (2013.01); *G06F 2212/62* (2013.01); *Y02D 10/13* (2018.01); *Y02D 10/14* (2018.01); *Y02D 10/151* (2018.01)

(56) References Cited

U.S. PATENT DOCUMENTS

| | | | |
|---|---|---|---|
| 5,488,728 A * | 1/1996 | Dreyer | G06F 9/3836 710/120 |
| 5,615,349 A * | 3/1997 | Matsuo | G06F 9/3001 712/212 |
| 5,615,350 A | 3/1997 | Hesson | |
| 5,669,001 A | 9/1997 | Moreno | |
| 5,729,228 A | 3/1998 | Franaszek et al. | |
| 5,790,822 A | 8/1998 | Sheaffer et al. | |
| 5,796,997 A | 8/1998 | Lesartre et al. | |
| 5,809,450 A | 9/1998 | Chrysos et al. | |
| 5,845,103 A | 12/1998 | Sodani et al. | |
| 5,905,893 A | 5/1999 | Worrell | |
| 5,917,505 A | 6/1999 | Larson | |
| 5,930,491 A | 7/1999 | Hilgendorf et al. | |
| 5,943,501 A | 8/1999 | Burger et al. | |
| 6,016,399 A | 1/2000 | Chang | |
| 6,061,776 A | 5/2000 | Burger et al. | |
| 6,161,170 A | 12/2000 | Burger et al. | |
| 6,164,841 A | 12/2000 | Mattson et al. | |
| 6,178,498 B1 | 1/2001 | Sharangpani et al. | |
| 6,240,510 B1 | 5/2001 | Yeh et al. | |
| 6,282,708 B1 | 8/2001 | Augusteijn et al. | |
| 6,314,493 B1 | 11/2001 | Luick | |
| 6,353,883 B1 | 3/2002 | Grochowski et al. | |
| 6,463,524 B1 | 10/2002 | Delaney et al. | |
| 6,493,820 B2 | 12/2002 | Akkary et al. | |
| 6,529,922 B1 | 3/2003 | Hoge | |
| 6,662,294 B1 | 12/2003 | Kahle et al. | |
| 6,813,705 B2 | 11/2004 | Duesterwald et al. | |
| 6,820,192 B2 | 11/2004 | Cho et al. | |
| 6,892,292 B2 | 5/2005 | Henkel et al. | |
| 6,918,032 B1 | 7/2005 | Abdallah et al. | |
| 6,965,969 B2 | 11/2005 | Burger et al. | |
| 6,988,183 B1 | 1/2006 | Wong | |
| 7,032,217 B2 | 4/2006 | Wu | |
| 7,085,919 B2 | 8/2006 | Grochowski et al. | |
| 7,095,343 B2 | 8/2006 | Xie et al. | |
| 7,299,458 B2 | 11/2007 | Hammes | |
| 7,302,543 B2 | 11/2007 | Lekatsas et al. | |
| 7,380,038 B2 | 5/2008 | Gray | |
| 7,415,576 B2 | 8/2008 | Kamei et al. | |
| 7,487,340 B2 | 2/2009 | Luick | |
| 7,624,386 B2 | 11/2009 | Robison | |
| 7,676,650 B2 | 3/2010 | Ukai | |
| 7,676,669 B2 | 3/2010 | Ohwada | |
| 7,836,289 B2 | 11/2010 | Tani | |
| 7,853,777 B2 | 12/2010 | Jones et al. | |
| 7,877,580 B2 | 1/2011 | Eickemeyer et al. | |
| 7,917,733 B2 | 3/2011 | Kazuma | |
| 7,970,965 B2 | 6/2011 | Kedem et al. | |
| 8,055,881 B2 | 11/2011 | Burger et al. | |
| 8,055,885 B2 | 11/2011 | Nakashima | |
| 8,060,730 B2 | 11/2011 | Moyer et al. | |
| 8,127,119 B2 | 2/2012 | Burger et al. | |
| 8,180,997 B2 | 5/2012 | Burger et al. | |
| 8,201,024 B2 | 6/2012 | Burger et al. | |
| 8,250,555 B1 | 8/2012 | Lee et al. | |
| 8,312,452 B2 | 11/2012 | Neiger et al. | |
| 8,321,850 B2 | 11/2012 | Bruening et al. | |
| 8,424,015 B2 | 4/2013 | Arndt et al. | |
| 8,433,885 B2 | 4/2013 | Burger et al. | |
| 8,447,911 B2 | 5/2013 | Burger et al. | |
| 8,464,002 B2 | 6/2013 | Burger et al. | |
| 8,473,724 B1 * | 6/2013 | Kenville | G06F 9/30076 712/229 |
| 8,578,389 B1 | 11/2013 | Boucher | |
| 8,583,895 B2 | 11/2013 | Jacobs et al. | |
| 8,817,793 B2 | 8/2014 | Mushano | |
| 9,021,241 B2 | 4/2015 | Burger et al. | |
| 9,043,769 B2 | 5/2015 | Vorbach | |
| 9,053,292 B2 | 6/2015 | Abdallah | |
| 9,448,797 B2 | 9/2016 | Greiner et al. | |
| 9,471,371 B2 | 10/2016 | Busaba et al. | |
| 2001/0032308 A1 | 10/2001 | Grochowski et al. | |
| 2002/0016907 A1 | 2/2002 | Grochowski et al. | |
| 2003/0023959 A1 | 1/2003 | Park | |
| 2003/0070062 A1 | 4/2003 | Krishnan et al. | |
| 2003/0088759 A1 | 5/2003 | Wilkerson | |
| 2004/0083468 A1 | 4/2004 | Ogawa et al. | |
| 2004/0163082 A1 | 8/2004 | Tremblay et al. | |
| 2004/0193849 A1 | 9/2004 | Dundas | |
| 2004/0216095 A1 | 10/2004 | Wu | |
| 2005/0005084 A1 * | 1/2005 | Burger | G06F 9/4494 712/10 |
| 2005/0172277 A1 | 8/2005 | Chheda et al. | |
| 2005/0204348 A1 | 9/2005 | Horning et al. | |

(56) References Cited

U.S. PATENT DOCUMENTS

| | | |
|---|---|---|
| 2006/0090063 A1 | 4/2006 | Theis |
| 2007/0043960 A1 | 2/2007 | Bose et al. |
| 2007/0226735 A1 | 9/2007 | Nguyen et al. |
| 2007/0234018 A1* | 10/2007 | Feiste ................. G06F 9/30181 712/229 |
| 2007/0239975 A1 | 10/2007 | Wang |
| 2007/0260854 A1 | 11/2007 | Smith et al. |
| 2007/0288733 A1 | 12/2007 | Luick |
| 2008/0109637 A1 | 5/2008 | Martinez et al. |
| 2008/0184056 A1 | 7/2008 | Moyer et al. |
| 2009/0013135 A1 | 1/2009 | Burger et al. |
| 2009/0013160 A1 | 1/2009 | Burger et al. |
| 2009/0019263 A1 | 1/2009 | Shen et al. |
| 2009/0106541 A1 | 4/2009 | Mizuno et al. |
| 2009/0158017 A1 | 6/2009 | Mutlu et al. |
| 2009/0172371 A1 | 7/2009 | Joao et al. |
| 2010/0122073 A1 | 5/2010 | Narayanaswamy et al. |
| 2010/0146209 A1 | 6/2010 | Burger et al. |
| 2010/0161948 A1 | 6/2010 | Abdallah |
| 2010/0191943 A1 | 7/2010 | Bukris |
| 2010/0325395 A1 | 12/2010 | Burger et al. |
| 2010/0325608 A1 | 12/2010 | Radigan |
| 2011/0035551 A1 | 2/2011 | Hooker et al. |
| 2011/0060889 A1 | 3/2011 | Burger et al. |
| 2011/0072239 A1 | 3/2011 | Burger et al. |
| 2011/0078424 A1 | 3/2011 | Boehm et al. |
| 2011/0202749 A1 | 8/2011 | Jin et al. |
| 2011/0209151 A1 | 8/2011 | Chung et al. |
| 2012/0158647 A1 | 6/2012 | Yadappanavar et al. |
| 2012/0246657 A1 | 9/2012 | Abdallah |
| 2012/0303933 A1 | 11/2012 | Manet et al. |
| 2012/0311306 A1 | 12/2012 | Mushano |
| 2013/0198499 A1 | 8/2013 | Dice et al. |
| 2013/0332908 A1* | 12/2013 | Stall .................... G06F 11/3636 717/125 |
| 2014/0006714 A1 | 1/2014 | Cherukuri et al. |
| 2014/0136786 A1 | 5/2014 | Carpenter et al. |
| 2014/0136821 A1* | 5/2014 | Morishita ............. G06F 11/362 712/227 |
| 2014/0181475 A1 | 6/2014 | Abdallah |
| 2014/0189239 A1 | 7/2014 | Hum et al. |
| 2014/0215190 A1 | 7/2014 | Mylius et al. |
| 2014/0281402 A1* | 9/2014 | Comparan .......... G06F 9/30189 712/214 |
| 2014/0372736 A1 | 12/2014 | Greenhalgh |
| 2015/0006452 A1 | 1/2015 | Kim et al. |
| 2015/0026444 A1 | 1/2015 | Anderson et al. |
| 2015/0067662 A1 | 3/2015 | Palalau |
| 2015/0074309 A1 | 3/2015 | McKenney et al. |
| 2015/0089191 A1 | 3/2015 | Gonion et al. |
| 2015/0089202 A1 | 3/2015 | Qiu et al. |
| 2015/0100757 A1 | 4/2015 | Burger et al. |
| 2015/0127928 A1 | 5/2015 | Burger et al. |
| 2015/0186293 A1 | 7/2015 | Lin |
| 2015/0199199 A1 | 7/2015 | Burger et al. |
| 2016/0124834 A1* | 5/2016 | Davis ................... G06F 11/366 712/227 |
| 2016/0203081 A1 | 7/2016 | Kimura |
| 2016/0378499 A1 | 12/2016 | Burger et al. |
| 2017/0083318 A1 | 3/2017 | Burger et al. |
| 2017/0083319 A1 | 3/2017 | Burger et al. |
| 2017/0083320 A1 | 3/2017 | Burger et al. |
| 2017/0083334 A1 | 3/2017 | Burger et al. |
| 2017/0083341 A1 | 3/2017 | Burger et al. |
| 2017/0090939 A1 | 3/2017 | Gschwind |
| 2019/0087184 A1 | 3/2019 | Kothinti naresh et al. |

FOREIGN PATENT DOCUMENTS

| | | |
|---|---|---|
| JP | 2002149401 A | 5/2002 |
| JP | 2013500539 A | 7/2013 |
| WO | WO 2014193878 | 12/2014 |
| WO | WO 2015/069583 | 5/2015 |
| WO | WO 2016/210025 | 12/2016 |

OTHER PUBLICATIONS

Manohar, et al., "Precise Exceptions in Asynchronous Processors," In Proceedings of the 19th Conference on Advanced Research in VLSI, Mar. 14, 2001, 13 pages.

PCT Chapter II Demand for International Preliminary Examination and amended claims under Article 34 submitted to the European Patent Office dated Mar. 7, 2017, for PCT/US2016/051411, 7 pages.

"International Preliminary Report on Patentability Issued in PCT Application No. PCT/US2016/051411", dated Nov. 9, 2017, 9 Pages.

International Search Report and Written Opinion, dated Nov. 29, 2016, issued in corresponding International Application No. PCT/2016/051411, 13 pages.

Second Written Opinion of the International Preliminary Examining Authority issued in corresponding PCT/US2016/051411 (dated Jul. 28, 2017), 8pp.

Smith et al., "Implementing Precise Interrupts in Pipelined Processors," IEEE Transactions on Computers, vol. 37, Issue 5, May 1988, pp. 562-573.

Smith et al., "Implementation of Precise Interrupts in Pipelined Processors," from the companion CD-ROM to the IEEE CS Press book the Anatomy of a Microprocessor: A Systems Perspective, by Shriver & Smith, 1998, pp. 1-15.

"Explicit Data Graph Execution", Retrieved on: Aug. 31, 2015 Available at: http://en.wikipedia.org/wiki/Explicit_Data_Graph_Execution.

"P6 Microarchitecture Tuning Guide", Published on: Jan. 3, 2013 Available at: http://people.cs.clemson.edu/~mark/330/colwell/p6_tuning.pdf.

Bouwens et al., "Architecture Enhancements for the ADRES Coarse-Grained Reconfigurable Array," High Performance Embedded Architectures and Compilers, Springer Berlin Heidelberg pp. 66-81 (2008).

Burger, et al., "Scaling to the End of Silicon with EDGE Architectures", In Journal of Computer, vol. 37, Issue 7, Jul. 2004, pp. 44-55.

Coons et al., "A Spatial Path Scheduling Algorithm for EDGE Architectures," In Proceedings of the 12th International Conference on Architectural Support for Programming Languages and Operating Systems (ASPLOS), Oct. 12, 2006, 12 pages.

Desikan, et al., "Scalable Selective Re-Execution for EDGE Architectures", In Proceedings of the 11th international conference on Architectural support for programming languages and operating systems, Oct. 9, 2004, 13 pages.

Duric et al., "Dynamic-Vector Execution on a General Purpose EDGE Chip Multiprocessor," In Proceedings of the 2014 International Conference on Embedded Computers Syhstems: Architectures, Modeling, and Simulation (SAMOS XIV), Jul. 14-17, 2014, 8 pages.

Duric et al., "EVX: Vector Execution on Low Power EDGE Cores," Design, Automation and Test in European Conference and Exhibition, Mar. 24-28, 2014, 4 pages.

Duric et al., "ReCompAc: Reconfigurable compute accelerator," IEEE 2013 International Conference on Reconfigurable Computing and FPGAS (Reconfig), Dec. 9, 2013, 4 pages.

Gebhart et al., "An Evaluation of the TRIPS Computer System," In Proceedings of the 14th international conference on Architectural support for programming languages and operating systems, Mar. 7, 2009, 12 pages.

Govindan et al., "Scaling Power and Performance via Processor Composability," IEEE Transaction on Computers, No. 1, Aug. 2014, 14 pages.

Govindaraju et al., "DySER: Unifying Functionality and Parallelism Specialization for Energy-Efficient Computing," IEEE Micro, IEEE Service Center, Sep. 1, 2012, 14 pages.

Gray and Smith, "Towards an Area-Efficient Implementation of a High ILP EDGE Soft Processor: Comparing Out-of-Order Dataflow Instruction Scheduler Designs," poster temporarily on display during the 22nd IEEE International Symposium on Field-Programmable Custom Computing Machines, May 11-13, 2014, Boston, Massachusetts (poster on display for approximately 1-2 hours, and less than one day, May 2014).

(56) References Cited

OTHER PUBLICATIONS

Gulati et al., "Multitasking Workload Scheduling on Flexible Core Chip Multiprocessors," In Proceedings of the Computer Architecture News, vol. 36, Issue 2, May 2008, 10 pages.
Huang et al., "Compiler-Assisted Sub-Block Reuse," Retrieved on: Apr. 9, 2015; available at: http://citeseerx.ist.psu.edu/viewdoc/download?doi=10.1.1.33.155&rep=rep1&type=pdf (also published as Huang & Lilja, "Compiler-Assisted Sub-Block Reuse," UMSI ResearchReport/University of Minnesota Supercomputer Institute 73 (2000)).
Huang, "Improving Processor Performance Through Compiler-Assisted Block Reuse," In Doctoral Dissertation, May 2000, 125 pages.
Keckler et al., "Tera-Op Reliable Intelligently Adaptive Processing System (Trips)," In AFRL-IF-WP-TR-2004-1514, document dated Apr. 2004, 29 Pages.
Kim et al., "Composable Lightweight Processors," 13 pages (document also published as Kim, et al., "Composable lightweight processors," 40th Annual IEEE/ACM International Symposium on Microarchitecture (MICRO 2007), pp. 381-394, (2007)).
Li et al., "Code Layout Optimization for Defensiveness and Politeness in Shared Cache," 11 pages, (also published as Li, et al, "Code Layout Optimization for Defensiveness and Politeness in Shared Cache" 43rd International Conference on Parallel Processing (ICPP), IEEE, pp. 151-161 (2014)).
Li, et al., "Compiler-assisted Hybrid Operand Communication", In TechReport TR-09-33, Nov. 2009, 12 pages.
Li, Kaiping, "Bidirectional Sequential decoding", In Doctoral Dissertation, Jun. 1994, 173 pages.
Manna, et al., "Dawn: A Novel Strategy for Detecting ASCII Worms in Networks", In Proceedings of 27th IEEE International Conference on Computer Communications, Apr. 13, 2008, pp. 1-9.
McDonald et al., TRIPS Processor Reference Manual, Computer Science Department, University of Texas at Austin, pp. 1-194, 2005.
Mei et al., "ADRES: An Architecture with Tightly Coupled VLIW Processor and Coarse-Grained Reconfiguration Matrix," 10 pages, (also published as Mei, et al. "ADRES: An architecture with tightly coupled VLIW processor and coarse-grained reconfigurable matrix," In Proceedings of 13th International Conference on Field-Programmable Logic and Applications, pp. 61-70 (Sep. 2003)).
Melvin et al., "Enhancing Instruction Scheduling with a Block-Structured ISA," International Journal of Parallel Programming, vol. 23, No. 3, Jun. 1995, 23 pages.
Microsoft Research, "E2," document downloaded on Apr. 10, 2015 from http://research.microsoft.com/en-us/projects/e2/.
Nagarajan, et al., "Static Placement, Dynamic Issue (SPDI) Scheduling for EDGE Architectures", In Proceedings. 13th International Conference on Parallel Architecture and Compilation Techniques, Sep. 29, 2004, 11 pages.
Park et al., "Polymorphic Pipeline Array: A flexible multicore accelerator with virtualized execution for mobile multimedia applications," 42nd Annual IEEE/ACM International Symposium on Microarchitecture, Dec. 12, 2009, 11 pages.
Pengfei, et al., "M5 Based EDGE Architecture Modeling", In Proceedings of IEEE International Conference on Computer Design, Oct. 3, 2010, pp. 289-296.
Putnam, et al., "Dynamic Vectorization in the E2 Dynamic Multicore Architecture", In Proceedings of ACM SIGARCH Computer Architecture News, vol. 38, Issue 4, Sep. 2010, 6 pages.
Robatmili et al., "How to Implement Effective Prediction and Forwarding for Fusable Dynamic Multicore Architectures," In Proceedings of the 19th IEEE International Symposium on High-Performance Computer Architecture, Feb. 23, 2013, 12 pages.
Sankaralingam et al., "Distributed Microarchitectural Protocols in the TRIPS Prototype Processor," 12 pages (also published as "Distributed Microarchitectural Protocols in the TRIPS Prototype Processor," Proceedings of 39th Annual IEEE/ACM International Symposium on Microarchitecture, pp. 480-491 (2006)).

Sankaralingam et al., "Exploiting ILP, TLP, and DLP with Polymorphous TRIPS Architecture," In Proceedings of the 30th Annual International Symposium on Computer Architecture, Jun. 9, 2003, 12 pages.
Sibi et al., "Scaling Power and Performance via Processor Composability," University of Texas at Austin technical report No. TR-10-14 (2010), 20 pages.
Smith et al., "Compiling for EDGE Architectures," In Proceedings of International Symposium on Code Generation and Optimization, Mar. 26, 2006, 11 pages.
Smith, "Explicit Data Graph Compilation," In Thesis, Dec. 2009, 201 pages.
Smith, "TRIPS Application Binary Interface (ABI) Manual," Technical Report TR-05-22, Department of Computer Sciences, The University of Texas at Austin, Technical Report TR-05-22, document marked Oct. 10, 2006, 16 pages.
Tamches et al., "Dynamic Kernel Code Optimization," In Workshop on Binary Translation, 2001, 10 pages.
Burger et al., "Design and Implementation of the TRIPS EDGE Architecture", In Proceedings of the 32nd Annual International Symposium on Computer Architecture, Jun. 4, 2005, pp. 1-41.
Fallin, et al., "The Heterogeneous Block Architecture", In Proceedings of 32nd IEEE International Conference on Computer Design, Oct. 19, 2014, pp. 1-8.
Govindan, "E3:Energy-Efficient Edge Architectures", In Dissertation, Aug. 2010, 244 pages.
Gupta, "Design Decisions for Tiled Architecture Memory Systems," document marked Sep. 18, 2009, available at: http://cseweb.ucsd.edu/~a2gupta/uploads/2/2/7/3/22734540/researchexam.paper.pdf, 14 pages.
Hao et al., "Increasing the Instruction Fetch Rate via Block-Structured Instruction Set Architectures", In Proceedings of the 29th Annual IEEE/ACM International Symposium on Microarchitecture, Dec. 2, 1996, pp. 191-200.
Ipek et al., "Core Fusion: Accommodating Software Diversity in Chip Multiprocessors", In Proceedings of the 34th annual international symposium on Computer architecture, Jun. 9, 2007, 12 pages.
Kavi, et al., "Concurrency, Synchronization, Speculation—the Dataflow Way", In Journal of Advances in Computers, vol. 96, Nov. 23, 2013, pp. 1-41.
Kozumplik, et al., "TRIPS to the Semantic EDGE", Retrieved on: Sep. 22, 2015, Available at: http://vbn.aau.dk/ws/files/61072300/1212050422.pdf.
Liu, "Hardware Techniques to Improve Cache Efficiency", In Dissertation of the University of Texas at Austin, May 2009, 189 pages.
Maher, "Atomic Block Formation for Explicit Data Graph Execution Architectures", In Dissertation of Doctor of Philosophy, Aug. 2010, 185 pages.
Maher et al., "Merging Head and Tail Duplication for Convergent Hyperblock Formation," In Annual IEEE/ACM International Symposium on Microarchitecture, Dec. 2006, 12 pages.
McDonald et al., "Characterization of TCC on Chip-Multiprocessors," Parallel Architectures and Compilation Techniques, 2005. PACT 2005. 14th International Conference on. IEEE, 2005, 12 pages.
Munshi, et al., "A Parameterizable SIMD Stream Processor", In Proceedings of Canadian Conference on Electrical and Computer Engineering, May 1, 2005, pp. 806-811.
Nagarajan et al., "Critical Path Analysis of the TRIPS Architecture," In IEEE International Symposium on Performance Analysis of Systems and Software, Mar. 19, 2006, 11 pages.
Nagarajan et al., "A Design Space Evaluation of Grid Processor Architectures," In Proceedings of the 34th annual ACM/IEEE international symposium on Microarchitecture, Dec. 1, 2001, pp. 40-51.
Pierce et al., "Wrong-Path Instruction Prefetching", In Proceedings of the 29th Annual IEEE/ACM International Symposium on Microarchitecture, Dec. 2, 1996, pp. 1-17.
Robatmili et al., "Exploiting Criticality to Reduce Bottlenecks in Distributed Uniprocessors," 17th IEEE International Symposium on High-Performance Computer Architecture (HPCA-17), Feb. 2011, 12 pages.

(56) References Cited

OTHER PUBLICATIONS

Roesner, "Counting Dependence Predictors," In Undergraduate Honors Thesis, May 2, 2008, 25 pages.

Sankaralingam, "Polymorphous Architectures: A Unified Approach for Extracting Concurrency of Different Granularities", In Doctoral Dissertation of Philosophy, Aug. 2007, 276 pages.

Sankaralingam, et al., "TRIPS: A Polymorphous Architecture for Exploiting ILP, TLP, and DLP", In Journal of ACM Transactions on Architecture and Code Optimization, vol. 1, No. 1, Mar. 2004, pp. 62-93.

Sethumadhavan et al., "Design and Implementation of the TRIPS Primary Memory System," In Proceedings of International Conference on Computer Design, Oct. 1, 2006, 7 pages.

Smith et al., "Dataflow Predication", In Proceedings of 39th Annual IEEE/ACM International Symposium on Microarchitecture, Dec. 9, 2006, 12 pages.

Souza et al., "Dynamically Scheduling VLIW Instructions", In Journal of Parallel and Distributed Computing, vol. 60, Jul. 2000, pp. 1480-1511.

Wu et al., "Block Based Fetch Engine for Superscalar Processors", In Proceedings of the 15th International Conference on Computer Applications in Industry and Engineering, Nov. 7, 2002, 4 pages.

Zmily, "Block-Aware Instruction Set Architecture", In Doctoral Dissertation, Jun. 2007, 176 pages.

Zmily et al., "Block-Aware Instruction Set Architecture", In Proceedings of ACM Transactions on Architecture and Code Optimization, vol. 3, Issue 3, Sep. 2006, pp. 327-357.

Zmily, et al., "Improving Instruction Delivery with a Block-Aware ISA", In Proceedings of 11th International Euro-Par Conference on Parallel Processing, Aug. 30, 2005, pp. 530-539.

"Very Long Instruction Word", Retrieved From: http://en.wikipedia.org/wiki/Verylong_instruction_word, Feb. 13, 2013, 7 Pages.

"Final Office Action Issued in U.S. Appl. No. 14/757,944", dated Jul. 9, 2018, 18 Pages.

"Non Final Office Action Issued in U.S. Appl. No. 14/757,944", dated Sep. 21, 2017, 21 Pages.

August, et al., "A Framework for Balancing Control Flow and Predication", In IEEE/ACM 30th Annual International Symposium on Microarchitecture, Dec. 3, 1997, 12 Pages.

Chang, et al., "Using Predicated Execution to Improve the Performance of a Dynamically Scheduled Machine with Speculative Execution", In International Journal of Parallel Programming, vol. 24, Issue 3, Jun. 1996, 11 Pages.

Chuang, et al., "Predicate Prediction for Efficient Out-of-Order Execution", In Proceedings of the 17th Annual International Conference on Supercomputing, Jun. 23, 2003, 10 Pages.

Coons, et al., "Optimal Huffman Tree-Height Reduction for Instruction-Level Parallelism", In Technical Report TR-08-34, Aug. 2007, 26 Pages.

Ebcioglu, et al., "An Eight-Issue Tree-VLIW Processor for Dynamic Binary Translation", In Proceedings of the International Conference on Computer Design, Nov. 1998, 9 Pages.

Ferrante, et al., "The Program Dependence Graph and Its Use in Optimization", In Proceedings of ACM Transactions on Programming Languages and Systems, vol. 9, Issue 3, Jul. 1, 1987, 31 Pages.

Havanki, et al., "Treegion Scheduling for Wide Issue Processors", In Proceedings of the 4th International Symposium on High-Performance Computer Architecture, Feb. 1, 1998, 11 Pages.

Huh, et al., "A NUCA Substrate for Flexible CMP Cache Sharing", In Proceedings of 19th International Conference on Supercomputing, Jun. 20, 2005, 10 Pages.

Mahlke, et al., "Effective Compiler Support for Predicated Execution Using the Hyperblock", In Proceedings of the 25th Annual International Symposium on Microarchitecture, Dec. 1992, 10 Pages.

Mahlke, Scott Alan, "Exploiting Instruction Level Parallelism in the Presence of Conditional Branches", In Doctoral Dissertation Submitted in the Department of Electrical and Computer Engineering, Sep. 1996, 292 Pages.

Mai, et al., "Smart Memories: A Modular Reconfigurable Architecture", In Proceedings of the 27th International Symposium on Computer Architecture, Jun. 14, 2011, 11 Pages.

Moreno, et al., "Scalable Instruction-level Parallelism through Tree-Instructions", In Proceedings of the 11th International Conference on Supercomputing, Jul. 11, 1997, 14 Pages.

Netto, et al., "Code Compression to Reduce Cache Accesses", In Technical Report—IC-03-023, Nov. 2003, 15 Pages.

Pan, et al., "High Performance, Variable-Length Instruction Encodings", In Doctoral Dissertation, Massachusetts Institute of Technology, May 2002, 53 Pages.

Parcerisa, et al., "Design of Clustered Superscalar Microarchitectures", In Thesis Submitted to Polytechnic University of Catalunya, Barcelona (Spain), Apr. 2004, 28 Pages.

"International Search Report and Written Opinion Issued in PCT Application No. PCT/US2016/051207", dated Dec. 16, 2016, 11 Pages.

Pnevmatikatos, et al., "Guarded Execution and Branch Prediction in Dynamic ILP Processors", In Proceedings of the 21st Annual International Symposium on Computer Architecture, Apr. 1994, 11 Pages.

Quinones, et al., "Improving Branch Predication and Predicated Execution in Out-of-Order Processors", In IEEE 13th International Symposium on High Performance Computer Architecture, Feb. 2007, 10 Pages.

Quinones, et al., "Selective Predicate Prediction for Out-of-Order Processors", In Proceedings of the 20th Annual International Conference on Supercomputing, Jun. 28, 2009, 9 Pages.

Ranganathan, Nitya, "Control Flow Speculation for Distributed Architectures", In Dissertation Presented to the Faculty of the Graduate School of the University of Texas at Austin, May 2009, 40 Pages.

Ros, et al., "A Hamming Distance Based VLIW/EPIC Code Compression Technique", In Proceedings of the International Conference on Compilers, Architecture, and Synthesis for Embedded Systems, Sep. 22, 2004, 8 Pages.

Sankaralingam, et al., "Universal Mechanisms for Data-Parallel Architectures", In Proceedings of the 36th International Symposium on Microarchitecture, Dec. 3, 2003, 12 Pages.

Simon, et al., "Incorporating Predicate Information Into Branch Predictors", In Proceedings of the 9th International Symposium on High-Performance Computer Architecture, Feb. 2003, 12 Pages.

Sohi, et al., "High-Bandwidth Data Memory Systems for Superscalar Processors", In Proceedings of the 4th International Conference on Architectural Support for Programming Languages and Operating Systems, Apr. 1991, 8 Pages.

Uht, et al., "Disjoint Eager Execution: An Optimal Form of Speculative Execution", In Proceedings of the 28th International Symposium on Microarchitecture, Nov. 1995, 13 Pages.

Wilson, et al., "Designing High Bandwidth On-Chip Caches", In Proceedings of the 24th Annual International Symposium on Computer Architecture, Jun. 1997, 12 Pages.

Xie, et al., "A Code Decompression Architecture for VLIW Processors", In Proceedings of 34th ACM/IEEE International Symposium on Microarchitecture, Dec. 1, 2001, 10 Pages.

McDonald, et al., "The Design and Implementation of the TRIPS Prototype Chip", In IEEE Hot Chips XVII Symposium (HCS), Aug. 17, 2005, 24 Pages.

"Non Final Office Action Issued in U.S. Appl. No. 14/757,941", dated Jan. 11, 2019, 16 Pages.

"Final Office Action Issued in U.S. Appl. No. 14/942,345", dated Dec. 31, 2018, 14 Pages.

"Non Final Office Action Issued in U.S. Appl. No. 14/942,461", dated Jan. 18, 2019, 9 Pages.

"Non Final Office Action Issued in U.S. Appl. No. 15/073,365", dated Dec. 4, 2018, 13 Pages.

"Final Office Action Issued in U.S. Appl. No. 15/074,938", dated Dec. 3, 2018, 9 Pages.

"Non Final Office Action in U.S. Appl. No. 15/595,582", dated Jan. 30, 2019, 7 Pages.

"International Search Report and Written Opinion Issued in PCT Application No. PCT/US2018/022117", dated Jun. 20, 2018, 14 Pages.

(56) References Cited

OTHER PUBLICATIONS

"Non Final Office Action Issued in U.S. Appl. No. 14/921,855", dated Apr. 17, 2019, 28 Pages.
Oshana, Robert, "Interrupt Management", In Software Engineering for Embedded Systems, Apr. 1, 2013, 5 Pages.
Duong, et al., "Compiler-Assisted, Selective Out-of-Order Commit", In Journal of IEEE Computer Architecture Letters, vol. 12, Issue 1, Jan. 2013, 4 Pages.
"Office Action Issued in European Patent Application No. 16774737.7", dated Oct. 29, 2019, 6 Pages.
"Final Office Action Issued in U.S. Appl. No. 15/595,582", dated Oct. 7, 2019, 9 Pages.
Lev, et al., "Split Hardware Transactions True Nesting of Transactions using Best-Effort Hardware Transactional Memory", In Proceedings of the 13th ACM SIGPLAN Symposium on Principles and practice of parallel programming, Feb. 20, 2008, pp. 197-206.

* cited by examiner

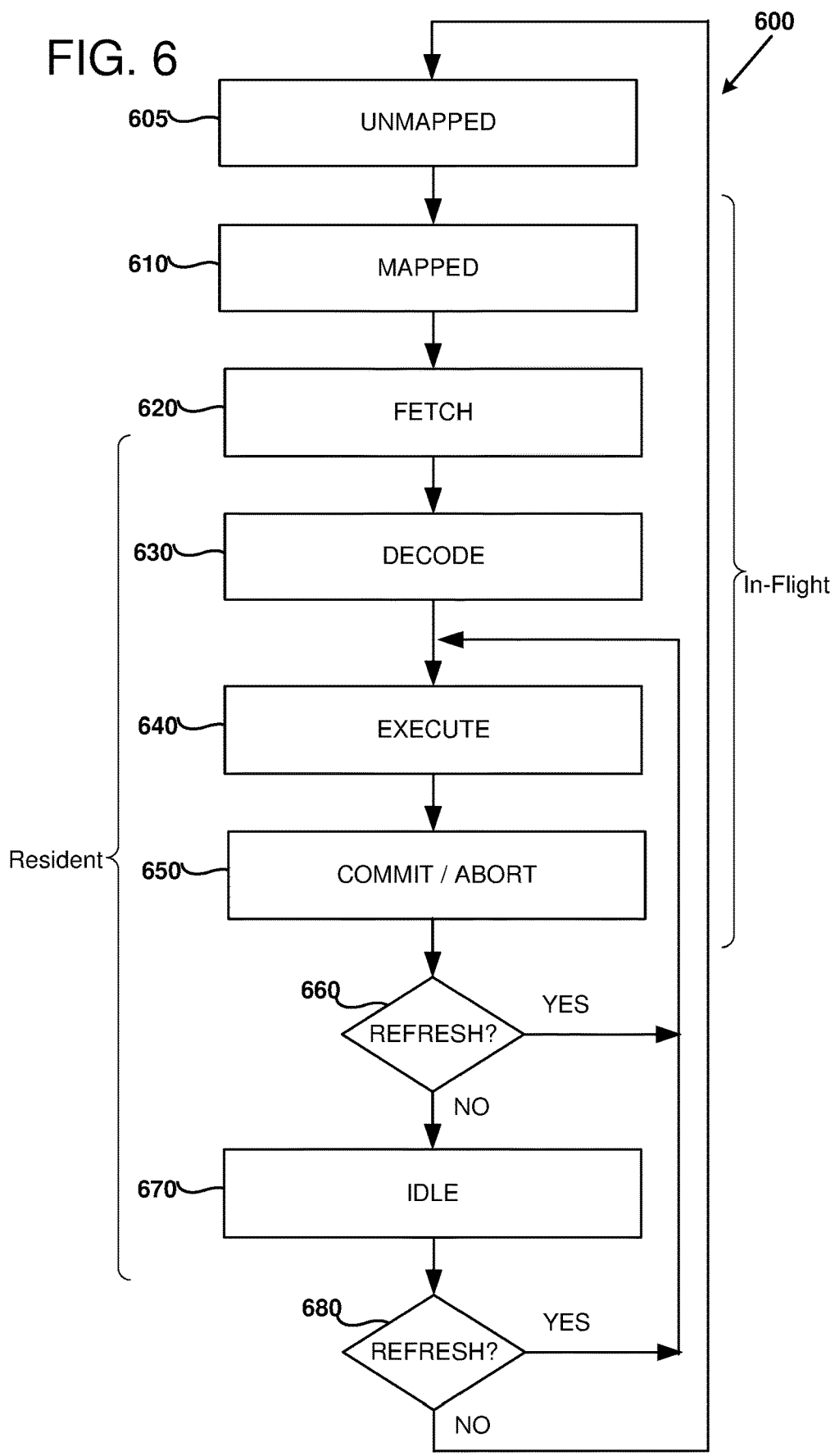

| Header | | | | |
|---|---|---|---|---|
| I[0] | read | R0 | T[1R] T[3L] | // read x from R0 |
| I[1] | addi | #1 | T[2L] | // x++; |
| I[2] | div | | W[R0] | // x /= y; (write x to R0) |
| I[3] | add | | W[R2] | // z = x + y; (write z to R2) |
| I[4] | read | R1 | T[3R] T[5R] | // read y from R1 |
| I[5] | subi | #1 | T[2R] W[R1] | // y--; (write y to R1) |
| I[6] | bro | nextBlockPC | | // branch to the next block |
| I[7] | nop | | | // no operation |

| Header | | | | |
|---|---|---|---|---|
| I[0] | read | R0 | T[3R] T[4L] | // read x from R0 |
| I[1] | read | R1 | T[4R] T[5R] | // read y from R1 |
| I[2] | bro | nextBlockPC | | // branch to the next block |
| I[3] | addi | #1 | T[6L] | // x++; |
| I[4] | add | | W[R2] | // z = x + y; (write z to R2) |
| I[5] | subi | #1 | T[6R] W[R1] | // y--; (write y to R1) |
| I[6] | div | | W[R0] | // x /= y; (write x to R0) |
| I[7] | nop | | | // no operation |

900

905

DEBUG SUPPORT FOR BLOCK-BASED PROCESSOR

CROSS-REFERENCE TO RELATED APPLICATIONS

This application claims the benefit of U.S. Provisional Application No. 62/221,003, entitled "BLOCK-BASED PROCESSORS," filed Sep. 19, 2015, the entire disclosure of which is incorporated herein by reference in its entirety.

BACKGROUND

Microprocessors have benefited from continuing gains in transistor count, integrated circuit cost, manufacturing capital, clock frequency, and energy efficiency due to continued transistor scaling predicted by Moore's law, with little change in associated processor Instruction Set Architectures (ISAs). However, the benefits realized from photolithographic scaling, which drove the semiconductor industry over the last 40 years, are slowing or even reversing. Reduced Instruction Set Computing (RISC) architectures have been the dominant paradigm in processor design for many years. Out-of-order superscalar implementations have not exhibited sustained improvement in area or performance. Accordingly, there is ample opportunity for improvements in processor ISAs to extend performance improvements.

SUMMARY

Methods, apparatus, and computer-readable storage devices are disclosed for support of debugging programs of a block-based processor instruction set architecture (BB-ISA). The described techniques and tools can potentially improve processor performance and can be implemented separately, or in various combinations with each other. As will be described more fully below, the described techniques and tools can be implemented in a digital signal processor, microprocessor, application-specific integrated circuit (ASIC), a soft processor (e.g., a microprocessor core implemented in a field programmable gate array (FPGA) using reconfigurable logic), programmable logic, or other suitable logic circuitry. As will be readily apparent to one of ordinary skill in the art, the disclosed technology can be implemented in various computing platforms, including, but not limited to, servers, mainframes, cellphones, smartphones, PDAs, handheld devices, handheld computers, touch screen tablet devices, tablet computers, wearable computers, and laptop computers.

In some examples of the disclosed technology, a processor includes a block-based processor core for executing an instruction block comprising an instruction header and a plurality of instructions. The block-based processor core includes execution control logic and core state access logic in communication with the execution control logic. The execution control logic is configured to schedule respective instructions of the plurality of instructions for execution in a dynamic order during a default execution mode and to schedule the respective instructions for execution in a static order during a debug mode. The core state access logic is configured to read intermediate states of the block-based processor core and to provide the intermediate states outside of the block-based processor core.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The foregoing and other objects, features, and advantages of the disclosed subject matter will become more apparent from the following detailed description, which proceeds with reference to the accompanying figures.

BRIEF DESCRIPTION OF THE DRAWINGS

FIG. 6 is a flowchart illustrating an example of a progression of states of a processor core of a block-based processor.

DETAILED DESCRIPTION

I. General Considerations

Figure 1:
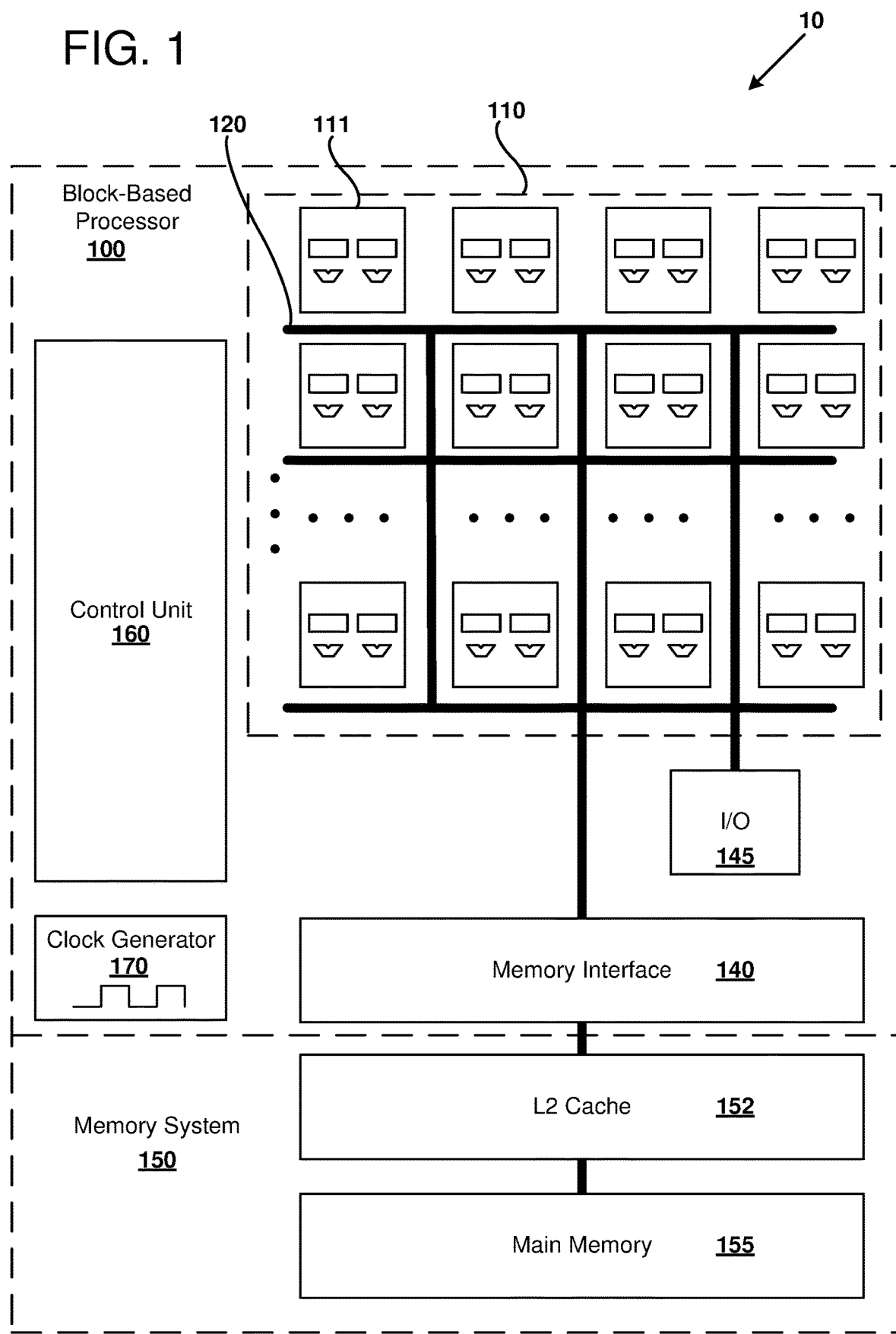
FIG. 1 illustrates a block-based processor including multiple processor cores, as can be used in some examples of the disclosed technology.

This disclosure is set forth in the context of representative embodiments that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "display," "receive," "emit," "verify," "execute," and "initiate" to describe the disclosed methods. These terms are high-level descriptions of the actual operations that are performed. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions stored on one or more computer-readable media (e.g., computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., computer-readable storage media). The computer-executable instructions can be part of, for example, a dedicated software application or a software application that is accessed or downloaded via a web browser or other software application (such as a remote computing application). Such software can be executed, for example, on a single local computer (e.g., with general-purpose and/or block-based processors executing on any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

II. Introduction to the Disclosed Technologies

Superscalar out-of-order microarchitectures employ substantial circuit resources to rename registers, schedule instructions in dataflow order, clean up after miss-speculation, and retire results in-order for precise exceptions. This includes expensive energy-consuming circuits, such as deep, many-ported register files, many-ported content-accessible memories (CAMs) for dataflow instruction scheduling wakeup, and many-wide bus multiplexers and bypass networks, all of which are resource intensive. For example, FPGA-based implementations of multi-read, multi-write RAMs typically require a mix of replication, multi-cycle operation, clock doubling, bank interleaving, live-value tables, and other expensive techniques.

The disclosed technologies can realize energy efficiency and/or performance enhancement through application of techniques including high instruction-level parallelism (ILP), out-of-order (OoO), superscalar execution, while avoiding substantial complexity and overhead in both processor hardware and associated software. In some examples of the disclosed technology, a block-based processor comprising multiple processor cores uses an Explicit Data Graph Execution (EDGE) ISA designed for area- and energy-efficient, high-ILP execution. In some examples, use of EDGE architectures and associated compilers finesses away much of the register renaming, CAMs, and complexity. In some examples, the respective cores of the block-based processor can store or cache fetched and decoded instructions that may be repeatedly executed, and the fetched and decoded instructions can be reused to potentially achieve reduced power and/or increased performance.

In certain examples of the disclosed technology, an EDGE ISA can eliminate the need for one or more complex architectural features, including register renaming, dataflow analysis, misspeculation recovery, and in-order retirement while supporting mainstream programming languages such as C and C++. In certain examples of the disclosed technology, a block-based processor executes a plurality of two or more instructions as an atomic block. Block-based instructions can be used to express semantics of program data flow and/or instruction flow in a more explicit fashion, allowing for improved compiler and processor performance. In certain examples of the disclosed technology, an explicit data graph execution instruction set architecture (EDGE ISA) includes information about program control flow that can be used to improve detection of improper control flow instructions, thereby increasing performance, saving memory resources, and/or and saving energy.

In some examples of the disclosed technology, instructions organized within instruction blocks are fetched, executed, and committed atomically. Intermediate results produced by the instructions within an atomic instruction block are buffered locally until the instruction block is committed. When the instruction block is committed, updates to the visible architectural state resulting from executing the instructions of the instruction block are made visible to other instruction blocks. Instructions inside blocks execute in dataflow order, which reduces or eliminates using register renaming and provides power-efficient OoO execution. A compiler can be used to explicitly encode data dependencies through the ISA, reducing or eliminating burdening processor core control logic from rediscovering dependencies at runtime. Using predicated execution, intra-block branches can be converted to dataflow instructions, and dependencies, other than memory dependencies, can be limited to direct data dependencies. Disclosed target form encoding techniques allow instructions within a block to communicate their operands directly via operand buffers, reducing accesses to a power-hungry, multi-ported physical register files.

During typical operation of a block-based program, the intermediate results (such as values of the operand buffers) produced within an atomic instruction block are not available outside of a processor core where the instruction block is executed. However, the intermediate results can potentially be useful when a programmer is debugging a block-based program. In some examples of the disclosed technology, support is provided to potentially enable a programmer to debug a program targeted to the block-based processor. For example, support for debugging can be provided within compiler software, debug software, and/or the hardware of the block-based processor.

Between instruction blocks, instructions can communicate using visible architectural state such as memory and registers. Thus, by utilizing a hybrid dataflow execution model, EDGE architectures can still support imperative programming languages and sequential memory semantics, but desirably also enjoy the benefits of out-of-order execution with near in-order power efficiency and complexity.

As will be readily understood to one of ordinary skill in the relevant art, a spectrum of implementations of the disclosed technology are possible with various area, performance, and power tradeoffs.

III. Example Block-Based Processor

FIG. 1 is a block diagram 10 of a block-based processor 100 as can be implemented in some examples of the disclosed technology. The processor 100 is configured to execute atomic blocks of instructions according to an instruction set architecture (ISA), which describes a number of aspects of processor operation, including a register model, a number of defined operations performed by block-based instructions, a memory model, interrupts, and other architectural features. The block-based processor includes a plurality of processing cores 110, including a processor core 111.

As shown in FIG. 1, the processor cores are connected to each other via core interconnect 120. The core interconnect 120 carries data and control signals between individual ones of the cores 110, a memory interface 140, and an input/output (I/O) interface 145. The core interconnect 120 can transmit and receive signals using electrical, optical, magnetic, or other suitable communication technology and can provide communication connections arranged according to a number of different topologies, depending on a particular desired configuration. For example, the core interconnect 120 can have a crossbar, a bus, a point-to-point bus, or other suitable topology. In some examples, any one of the cores 110 can be connected to any of the other cores, while in other examples, some cores are only connected to a subset of the other cores. For example, each core may only be connected to a nearest 4, 8, or 20 neighboring cores. The core interconnect 120 can be used to transmit input/output data to and from the cores, as well as transmit control signals and other information signals to and from the cores. For example, each of the cores 110 can receive and transmit semaphores that indicate the execution status of instructions currently being executed by each of the respective cores. In some examples, the core interconnect 120 is implemented as wires connecting the cores 110, and memory system, while in other examples, the core interconnect can include circuitry for multiplexing data signals on the interconnect wire(s), switch and/or routing components, including active signal drivers and repeaters, or other suitable circuitry. In some examples of the disclosed technology, signals transmitted within and to/from the processor 100 are not limited to full swing electrical digital signals, but the processor can be configured to include differential signals, pulsed signals, or other suitable signals for transmitting data and control signals.

In the example of FIG. 1, the memory interface 140 of the processor includes interface logic that is used to connect to additional memory, for example, memory located on another integrated circuit besides the processor 100. As shown in FIG. 1 an external memory system 150 includes an L2 cache 152 and main memory 155. In some examples the L2 cache can be implemented using static RAM (SRAM) and the main memory 155 can be implemented using dynamic RAM (DRAM). In some examples the memory system 150 is included on the same integrated circuit as the other components of the processor 100. In some examples, the memory interface 140 includes a direct memory access (DMA) controller allowing transfer of blocks of data in memory without using register file(s) and/or the processor 100. In some examples, the memory interface 140 can include a memory management unit (MMU) for managing and allocating virtual memory, expanding the available main memory 155.

The I/O interface 145 includes circuitry for receiving and sending input and output signals to other components, such as hardware interrupts, system control signals, peripheral interfaces, co-processor control and/or data signals (e.g., signals for a graphics processing unit, floating point coprocessor, physics processing unit, digital signal processor, or other co-processing components), clock signals, semaphores, or other suitable I/O signals. The I/O signals may be synchronous or asynchronous. In some examples, all or a portion of the I/O interface is implemented using memory-mapped I/O techniques in conjunction with the memory interface 140.

The block-based processor 100 can also include a control unit 160. The control unit can communicate with the processing cores 110, the I/O interface 145, and the memory interface 140 via the core interconnect 120 or a side-band interconnect (not shown). The control unit 160 supervises operation of the processor 100. Operations that can be performed by the control unit 160 can include allocation and de-allocation of cores for performing instruction processing, control of input data and output data between any of the cores, register files, the memory interface 140, and/or the I/O interface 145, modification of execution flow, and verifying target location(s) of branch instructions, instruction headers, and other changes in control flow. The control unit 160 can also process hardware interrupts, and control reading and writing of special system registers, for example the program counter stored in one or more register file(s). In some examples of the disclosed technology, the control unit 160 is at least partially implemented using one or more of the processing cores 110, while in other examples, the control unit 160 is implemented using a non-block-based processing core (e.g., a general-purpose RISC processing core coupled to memory). In some examples, the control unit 160 is implemented at least in part using one or more of: hardwired finite state machines, programmable microcode, programmable gate arrays, or other suitable control circuits. In alternative examples, control unit functionality can be performed by one or more of the cores 110.

The control unit 160 includes a scheduler that is used to allocate instruction blocks to the processor cores 110. As used herein, scheduler allocation refers to hardware for directing operation of instruction blocks, including initiating instruction block mapping, fetching, decoding, execution, committing, aborting, idling, and refreshing an instruction block. In some examples, the hardware receives signals generated using computer-executable instructions to direct operation of the instruction scheduler. Processor cores 110 are assigned to instruction blocks during instruction block mapping. The recited stages of instruction operation are for illustrative purposes, and in some examples of the disclosed technology, certain operations can be combined, omitted, separated into multiple operations, or additional operations added.

The block-based processor 100 also includes a clock generator 170, which distributes one or more clock signals to various components within the processor (e.g., the cores 110, interconnect 120, memory interface 140, and I/O interface 145). In some examples of the disclosed technology, all of the components share a common clock, while in other examples different components use a different clock, for example, a clock signal having differing clock frequencies. In some examples, a portion of the clock is gated to allow power savings when some of the processor components are not in use. In some examples, the clock signals are generated using a phase-locked loop (PLL) to generate a signal of fixed, constant frequency and duty cycle. Circuitry that receives the clock signals can be triggered on a single edge (e.g., a rising edge) while in other examples, at least some of the receiving circuitry is triggered by rising and falling clock edges. In some examples, the clock signal can be transmitted optically or wirelessly.

IV. Example Block-Based Processor Core

Figure 2:
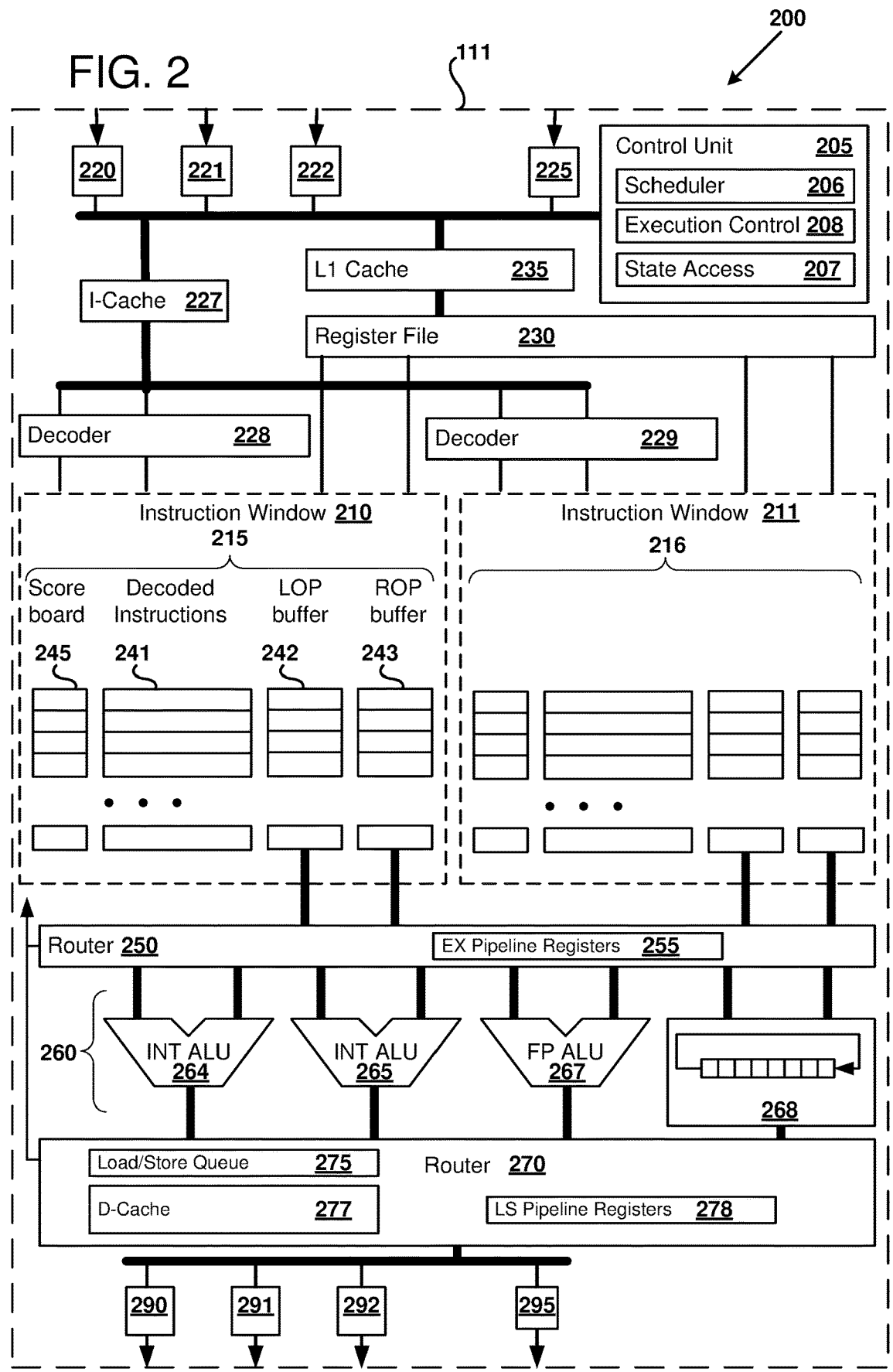
FIG. 2 illustrates a block-based processor core, as can be used in some examples of the disclosed technology.

FIG. 2 is a block diagram 200 further detailing an example microarchitecture for the block-based processor 100, and in particular, an instance of one of the block-based processor cores (processor core 111), as can be used in certain examples of the disclosed technology. For ease of explanation, the exemplary block-based processor core 111 is illustrated with five stages: instruction fetch (IF), decode (DC), operand fetch, execute (EX), and memory/data access (LS). However, it will be readily understood by one of ordinary skill in the relevant art that modifications to the illustrated microarchitecture, such as adding/removing stages, adding/removing units that perform operations, and other implementation details can be modified to suit a particular application for a block-based processor.

In some examples of the disclosed technology, the processor core 111 can be used to execute and commit an instruction block of a program. An instruction block is an atomic collection of block-based-processor instructions that includes an instruction block header and a plurality of instructions. As will be discussed further below, the instruction block header can include information describing an execution mode of the instruction block and information that can be used to further define semantics of one or more of the plurality of instructions within the instruction block. Depending on the particular ISA and processor hardware used, the instruction block header can also be used, during execution of the instructions, to improve performance of executing an instruction block by, for example, allowing for early fetching of instructions and/or data, improved branch prediction, speculative execution, improved energy efficiency, and improved code compactness.

The instructions of the instruction block can be dataflow instructions that explicitly encode relationships between producer-consumer instructions of the instruction block. In particular, an instruction can communicate a result directly to a targeted instruction through an operand buffer that is reserved only for the targeted instruction. The intermediate results stored in the operand buffers are generally not visible to cores outside of the executing core because the block-atomic execution model only passes final results between the instruction blocks. The final results from executing the instructions of the atomic instruction block are made visible outside of the executing core when the instruction block is committed. Thus, the visible architectural state generated by each instruction block can appear as a single transaction outside of the executing core, and the intermediate results are typically not observable outside of the executing core. However, a programmer may find the intermediate results useful when debugging a program running on a block-based processor. As described herein, the processor core 111 can include a debug mode where the intermediate results can be observed outside of the executing core by using a data-path reserved exclusively for debugging.

As shown in FIG. 2, the processor core 111 includes a control unit 205, which can receive control signals from other cores and generate control signals to regulate core operation and schedules the flow of instructions within the core using an instruction scheduler 206. The control unit 205 can include state access logic 207 for examining core status and/or configuring operating modes of the processor core 111. The control unit 205 can include execution control logic 208 for generating control signals during one or more operating modes of the processor core 111. Operations that can be performed by the control unit 205 and/or instruction scheduler 206 can include allocation and de-allocation of cores for performing instruction processing, control of input data and output data between any of the cores, register files, the memory interface 140, and/or the I/O interface 145. The control unit 205 can also process hardware interrupts, and control reading and writing of special system registers, for example the program counter stored in one or more register file(s). In other examples of the disclosed technology, the control unit 205 and/or instruction scheduler 206 are implemented using a non-block-based processing core (e.g., a general-purpose RISC processing core coupled to memory).

In some examples, the control unit 205, instruction scheduler 206, state access logic 207, and/or execution control logic 208 are implemented at least in part using one or more of: hardwired finite state machines, programmable microcode, programmable gate arrays, or other suitable control circuits.

The control unit 205 can decode the instruction block header to obtain information about the instruction block. For example, execution modes of the instruction block can be specified in the instruction block header though various execution flags. The decoded execution mode can be stored in registers of the execution control logic 208. Based on the execution mode, the execution control logic 208 can generate control signals to regulate core operation and schedule the flow of instructions within the core 111, such as by using the instruction scheduler 206. For example, during a default execution mode, the execution control logic 208 can sequence the instructions of one or more instruction blocks executing on one or more instruction windows (e.g., 210, 211) of the processor core 111. Specifically, each of the instructions can be sequenced through the instruction fetch, decode, operand fetch, execute, and memory/data access stages so that the instructions of an instruction block can be pipelined and executed in parallel. The instructions are ready to execute when their operands are available, and the instruction scheduler 206 can select the order in which to execute the instructions. As another example, during a debug execution mode, the execution control logic 208 can single-step the instructions of an instruction block executing on one or more instruction windows of the processor core 111. Specifically, each of the instructions can be sequenced through the instruction fetch and decode stages, and each of the instructions can be executed one instruction at a time. For example, a single instruction can be executed upon receiving an indication to perform a single-step operation. For example, the indication to perform the single-step operation can be received via the state access logic 207.

The state access logic 207 can include an interface for other cores and/or a processor-level control unit (such as the control unit 160 of FIG. 1) to communicate with and access state of the core 111. For example, the state access logic 207 can be connected to a core interconnect (such as the core interconnect 120 of FIG. 1) and the other cores can communicate via control signals, messages, reading and writing registers, and the like.

The state access logic 207 can include control state registers or other logic for modifying and/or examining modes and/or status of an instruction block and/or core status. As an example, the core status can indicate whether an instruction block is mapped to the core 111 or an instruction window (e.g., instruction windows 210, 211) of the core 111, whether an instruction block is resident on the core 111, whether an instruction block is executing on the core 111, whether the instruction block is ready to commit, whether the instruction block is performing a commit, and whether the instruction block is idle. As another example, the status of an instruction block can include a token or flag indicating the instruction block is the oldest instruction block executing and a flag indicating the instruction block is executing speculatively. As another example, the status of an instruction block can include an operating mode of the block, such as a default execution mode or a debug mode.

The control state registers (CSRs) can be mapped to unique memory locations that are reserved for use by the block-based processor. For example, CSRs of the control unit 160 (FIG. 1) can be assigned to a first range of addresses, CSRs of the memory interface 140 (FIG. 1) can be assigned to a second range of addresses, a first processor core can be assigned to a third range of addresses, a second processor core can be assigned to a fourth range of addresses, and so forth. In one embodiment, the CSRs can be accessed using general purpose memory read and write instructions of the block-based processor. Additionally or alternatively, the CSRs can be accessed using specific read and write instructions (e.g., the instructions have opcodes different from the memory read and write instructions) for the CSRs. Thus, one core can examine the configuration state of a different core by reading from an address corresponding to the different core's CSRs. Similarly, one core can modify the configuration state of a different core by writing to an address corresponding to the different core's CSRs. Additionally or alternatively, the CSRs can be accessed by shifting commands into the state access logic 207 through serial scan chains. In this manner, one core can examine the state access logic 207 of a different core and one core can modify the state access logic 207 or modes of a different core.

The state access logic 207 can include registers or other logic for configuring and/or reconfiguring the core to operate in different operating modes, as described further herein. For example, the state access logic 207 can include a control register bit, writable through a CSR, that controls whether the resident instruction block is executed in the default execution mode or a debug execution mode. Specifically, when the control bit is programmed with one value (e.g., a zero) the instruction block can execute in the default execution mode, but when the control bit is programmed with the opposite value (e.g., a one) the instruction block can execute in the debug execution mode. Thus, the core 111 can be configured and reconfigured to execute instruction blocks in the default execution mode or the debug execution mode by controlling the value of the control bit. The value of the control bit can also be controlled by logic of the control unit 205. For example, the control bit can be set in response to decoding an execution flag of the instruction block header or in response to a control signal associated with control bit being asserted.

Each of the instruction windows 210 and 211 can receive instructions and data from one or more of input ports 220, 221, and 222 which connect to an interconnect bus and instruction cache 227, which in turn is connected to the instruction decoders 228 and 229. Additional control signals can also be received on an additional input port 225. Each of the instruction decoders 228 and 229 decodes instructions for an instruction block and stores the decoded instructions within a memory store 215 and 216 located in each respective instruction window 210 and 211.

The processor core 111 further includes a register file 230 coupled to an L1 (level one) cache 235. The register file 230 stores data for registers defined in the block-based processor architecture, and can have one or more read ports and one or more write ports. For example, a register file may include two or more write ports for storing data in the register file, as well as having a plurality of read ports for reading data from individual registers within the register file. In some examples, a single instruction window (e.g., instruction window 210) can access only one port of the register file at a time, while in other examples, the instruction window 210 can access one read port and one write port, or can access two or more read ports and/or write ports simultaneously. In some examples, the register file 230 can include 64 registers, each of the registers holding a word of 32 bits of data. (This application will refer to 32-bits of data as a word, unless otherwise specified.) In some examples, some of the registers within the register file 230 may be allocated to special purposes. For example, some of the registers can be dedicated as system registers examples of which include registers storing constant values (e.g., an all zero word), program counter(s) (PC), which indicate the current address of a program thread that is being executed, a physical core number, a logical core number, a core assignment topology, core control flags, a processor topology, or other suitable dedicated purpose. In some examples, there are multiple program counter registers, one or each program counter, to allow for concurrent execution of multiple execution threads across one or more processor cores and/or processors. In some examples, program counters are implemented as designated memory locations instead of as registers in a register file. In some examples, use of the system registers may be restricted by the operating system or other supervisory computer instructions. In some examples, the register file 230 is implemented as an array of flip-flops, while in other examples, the register file can be implemented using latches, SRAM, or other forms of memory storage. The ISA specification for a given processor, for example processor 100, specifies how registers within the register file 230 are defined and used.

In some examples, the processor 100 includes a global register file that is shared by a plurality of the processor cores. In some examples, individual register files associated with a processor core can be combined to form a larger file, statically or dynamically, depending on the processor ISA and configuration.

As shown in FIG. 2, the memory store 215 of the instruction window 210 includes a number of decoded instructions 241, a left operand (LOP) buffer 242, a right operand (ROP) buffer 243, and an instruction scoreboard 245. In some examples of the disclosed technology, each instruction of the instruction block is decomposed into a row of decoded instructions, left and right operands, and scoreboard data, as shown in FIG. 2. The decoded instructions 241 can include partially- or fully-decoded versions of instructions stored as bit-level control signals. The operand buffers 242 and 243 store operands (e.g., register values received from the register file 230, data received from memory, immediate operands coded within an instruction, operands calculated by an earlier-issued instruction, or other operand values) until their respective decoded instructions are ready to execute. Instruction operands are read from the operand buffers 242 and 243, not the register file.

The memory store 216 of the second instruction window 211 stores similar instruction information (decoded instructions, operands, and scoreboard) as the memory store 215, but is not shown in FIG. 2 for the sake of simplicity. Instruction blocks can be executed by the second instruction window 211 concurrently or sequentially with respect to the first instruction window, subject to ISA constraints and as directed by the control unit 205.

In some examples of the disclosed technology, front-end pipeline stages IF and DC can run decoupled from the back-end pipelines stages (IS, EX, LS). In one embodiment, the control unit can fetch and decode two instructions per clock cycle into each of the instruction windows 210 and 211. In alternative embodiments, the control unit can fetch and decode one, four, or another number of instructions per clock cycle into a corresponding number of instruction windows. The control unit 205 provides instruction window dataflow scheduling logic to monitor the ready state of each decoded instruction's inputs (e.g., each respective instruction's predicate(s) and operand(s) using the scoreboard 245. When all of the inputs for a particular decoded instruction are ready, the instruction is ready to issue. The control logic 205 then initiates execution of one or more next instruction(s) (e.g., the lowest numbered ready instruction) each cycle and its decoded instruction and input operands are sent to one or more of functional units 260 for execution. The decoded instruction can also encode a number of ready events. The scheduler in the control logic 205 accepts these and/or events from other sources and updates the ready state of other instructions in the window. Thus execution proceeds, starting with the processor core's 111 ready zero input instructions, instructions that are targeted by the zero input instructions, and so forth.

The decoded instructions 241 need not execute in the same order in which they are arranged within the memory store 215 of the instruction window 210. Rather, the instruction scoreboard 245 is used to track dependencies of the decoded instructions and, when the dependencies have been met, the associated individual decoded instruction is scheduled for execution. For example, a reference to a respective instruction can be pushed onto a ready queue when the dependencies have been met for the respective instruction, and instructions can be scheduled in a first-in first-out (FIFO) order from the ready queue. Information stored in the scoreboard 245 can include, but is not limited to, the associated instruction's execution predicate (such as whether the instruction is waiting for a predicate bit to be calculated and whether the instruction executes if the predicate bit is true or false), availability of operands to the instruction, or other prerequisites required before executing the associated individual instruction.

In one embodiment, the scoreboard 245 can include decoded ready state, which is initialized by the instruction decoder 228, and active ready state, which is initialized by the control unit 205 during execution of the instructions. For example, the decoded ready state can encode whether a respective instruction has been decoded, awaits a predicate and/or some operand(s), perhaps via a broadcast channel, or is immediately ready to issue. The active ready state can encode whether a respective instruction awaits a predicate and/or some operand(s), is ready to issue, or has already issued. The decoded ready state can cleared on a block reset or a block refresh. Upon branching to a new instruction block, the decoded ready state and the active ready state is cleared (a block or core reset). However, when an instruction block is re-executed on the core, such as when it branches back to itself (a block refresh), only active ready state is cleared. Block refreshes can occur immediately (when an instruction block branches to itself) or after executing a number of other intervening instruction blocks. The decoded ready state for the instruction block can thus be preserved so that it is not necessary to re-fetch and decode the block's instructions. Hence, block refresh can be used to save time and energy in loops and other repeating program structures.

The number of instructions that are stored in each instruction window generally corresponds to the number of instructions within an instruction block. In some examples, the number of instructions within an instruction block can be 32, 64, 128, 1024, or another number of instructions. In some examples of the disclosed technology, an instruction block is allocated across multiple instruction windows within a processor core. In some examples, the instruction windows 210, 211 can be logically partitioned so that multiple instruction blocks can be executed on a single processor core. For example, one, two, four, or another number of instruction blocks can be executed on one core. The respective instruction blocks can be executed concurrently or sequentially with each other.

Instructions can be allocated and scheduled using the control unit 205 located within the processor core 111. The control unit 205 orchestrates fetching of instructions from memory, decoding of the instructions, execution of instructions once they have been loaded into a respective instruction window, data flow into/out of the processor core 111, and control signals input and output by the processor core. For example, the control unit 205 can include the ready queue, as described above, for use in scheduling instructions. The instructions stored in the memory store 215 and 216 located in each respective instruction window 210 and 211 can be executed atomically. Thus, updates to the visible architectural state (such as the register file 230 and the memory) affected by the executed instructions can be buffered locally within the core until the instructions are committed. The control unit 205 can determine when instructions are ready to be committed, sequence the commit logic, and issue a commit signal. For example, a commit phase for an instruction block can begin when all register writes are buffered, all writes to memory are buffered, and a branch target is calculated. The instruction block can be committed when updates to the visible architectural state are complete. For example, an instruction block can be committed when the register writes are written to the register file, the stores are sent to a load/store unit or memory controller, and the commit signal is generated. The control unit 205 also controls, at least in part, allocation of functional units 260 to each of the respective instructions windows.

As shown in FIG. 2, a first router 250, which has a number of execution pipeline registers 255, is used to send data from either of the instruction windows 210 and 211 to one or more of the functional units 260, which can include but are not limited to, integer ALUs (arithmetic logic units) (e.g., integer ALUs 264 and 265), floating point units (e.g., floating point ALU 267), shift/rotate logic (e.g., barrel shifter 268), or other suitable execution units, which can including graphics functions, physics functions, and other mathematical operations. Data from the functional units 260 can then be routed through a second router 270 to outputs 290, 291, and 292, routed back to an operand buffer (e.g. LOP buffer 242 and/or ROP buffer 243), or fed back to another functional unit, depending on the requirements of the particular instruction being executed. The second router 270 can include a load/store queue 275, which can be used to issue memory instructions, a data cache 277, which stores data being output from the core to memory, and load/store pipeline register 278.

The core also includes control outputs 295 which are used to indicate, for example, when execution of all of the instructions for one or more of the instruction windows 210 or 211 has completed. When execution of an instruction block is complete, the instruction block is designated as "committed" and signals from the control outputs 295 can in turn can be used by other cores within the block-based processor 100 and/or by the control unit 160 to initiate scheduling, fetching, and execution of other instruction blocks. Both the first router 250 and the second router 270 can send data back to the instruction (for example, as operands for other instructions within an instruction block).

As will be readily understood to one of ordinary skill in the relevant art, the components within an individual core are not limited to those shown in FIG. 2, but can be varied according to the requirements of a particular application. For example, a core may have fewer or more instruction windows, a single instruction decoder might be shared by two or more instruction windows, and the number of and type of functional units used can be varied, depending on the particular targeted application for the block-based processor. Other considerations that apply in selecting and allocating resources with an instruction core include performance requirements, energy usage requirements, integrated circuit die, process technology, and/or cost.

It will be readily apparent to one of ordinary skill in the relevant art that trade-offs can be made in processor performance by the design and allocation of resources within the instruction window (e.g., instruction window 210) and control logic 205 of the processor cores 110. The area, clock period, capabilities, and limitations substantially determine the realized performance of the individual cores 110 and the throughput of the block-based processor cores 110.

The instruction scheduler 206 can have diverse functionality. In certain higher performance examples, the instruction scheduler is highly concurrent. For example, each cycle, the decoder(s) write instructions' decoded ready state and decoded instructions into one or more instruction windows, selects the next instruction to issue, and, in response the back end sends ready events—either target-ready events targeting a specific instruction's input slot (predicate, left operand, right operand, etc.), or broadcast-ready events targeting all instructions. The per-instruction ready state bits, together with the decoded ready state can be used to determine that the instruction is ready to issue.

In some examples, the instruction scheduler 206 is implemented using storage (e.g., first-in first-out (FIFO) queues, content addressable memories (CAMs)) storing data indicating information used to schedule execution of instruction blocks according to the disclosed technology. For example, data regarding instruction dependencies, transfers of control, speculation, branch prediction, and/or data loads and stores are arranged in storage to facilitate determinations in mapping instruction blocks to processor cores. For example, instruction block dependencies can be associated with a tag that is stored in a FIFO or CAM and later accessed by selection logic used to map instruction blocks to one or more processor cores. In some examples, the instruction scheduler 206 is implemented using a general purpose processor coupled to memory, the memory being configured to store data for scheduling instruction blocks. In some examples, instruction scheduler 206 is implemented using a special purpose processor or using a block-based processor core coupled to the memory. In some examples, the instruction scheduler 206 is implemented as a finite state machine coupled to the memory. In some examples, an operating system executing on a processor (e.g., a general purpose processor or a block-based processor core) generates priorities, predictions, and other data that can be used at least in part to schedule instruction blocks with the instruction scheduler 206. As will be readily apparent to one of ordinary skill in the relevant art, other circuit structures, implemented in an integrated circuit, programmable logic, or other suitable logic can be used to implement hardware for the instruction scheduler 206.

In some cases, the scheduler 206 accepts events for target instructions that have not yet been decoded and must also inhibit reissue of issued ready instructions. Instructions can be non-predicated, or predicated (based on a true or false condition). A predicated instruction does not become ready until it is targeted by another instruction's predicate result, and that result matches the predicate condition. If the associated predicate does not match, the instruction never issues. In some examples, predicated instructions may be issued and executed speculatively. In some examples, a processor may subsequently check that speculatively issued and executed instructions were correctly speculated. In some examples a misspeculated issued instruction and the specific transitive closure of instructions in the block that consume its outputs may be re-executed, or misspeculated side effects annulled. In some examples, discovery of a misspeculated instruction leads to the complete roll back and re-execution of an entire block of instructions.

V. Example Stream of Instruction Blocks

Figure 3:
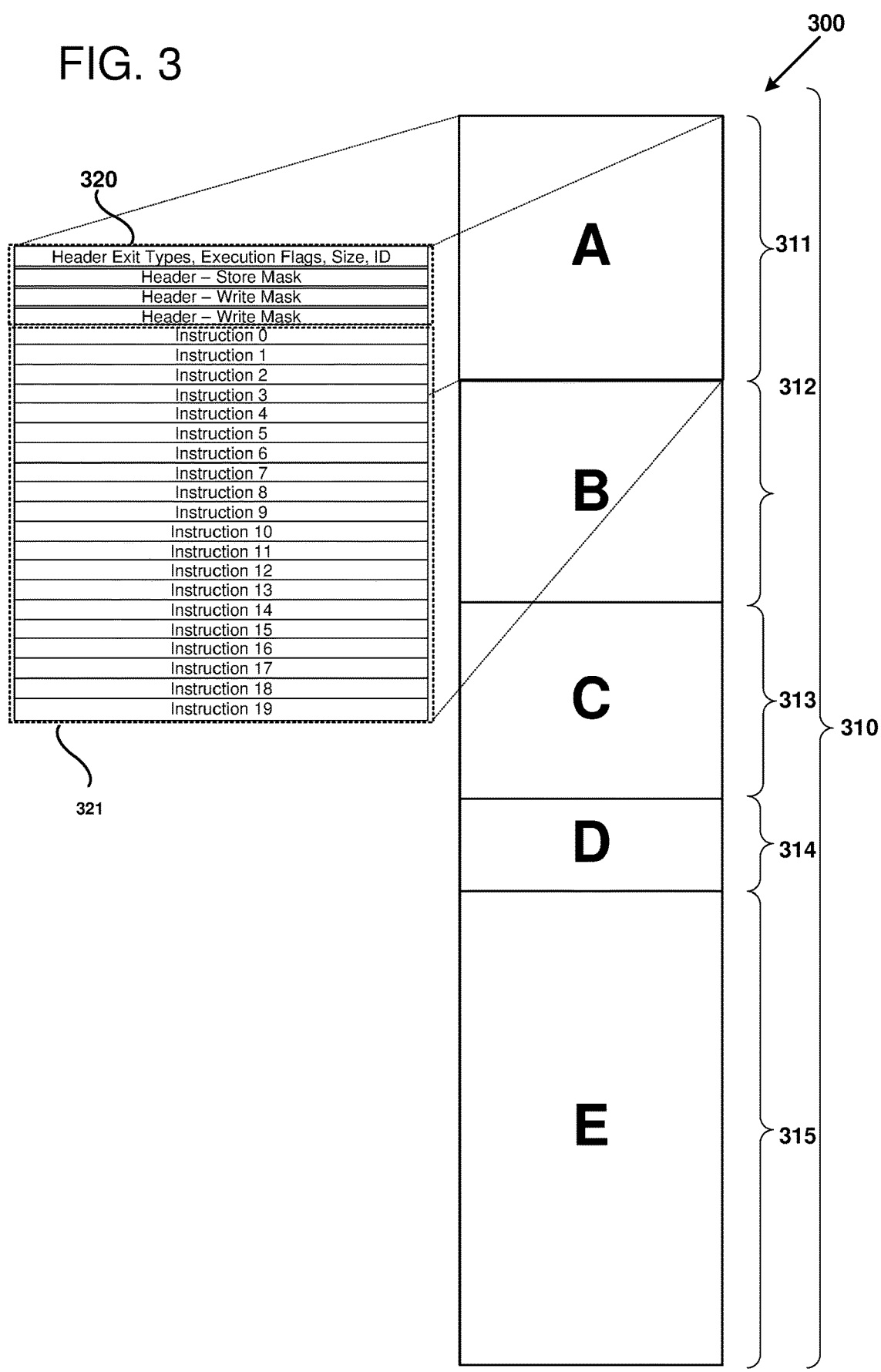
FIG. 3 illustrates a number of instruction blocks, according to certain examples of disclosed technology.

Turning now to the diagram 300 of FIG. 3, a portion 310 of a stream of block-based instructions, including a number of variable length instruction blocks 311-315 (A-E) is illustrated. The stream of instructions can be used to implement user application, system services, or any other suitable use. In the example shown in FIG. 3, each instruction block begins with an instruction header, which is followed by a varying number of instructions. For example, the instruction block 311 includes a header 320 and twenty instructions 321. The particular instruction header 320 illustrated includes a number of data fields that control, in part, execution of the instructions within the instruction block, and also allow for improved performance enhancement techniques including, for example branch prediction, speculative execution, lazy evaluation, and/or other techniques. The instruction header 320 also includes an ID bit which indicates that the header is an instruction header and not an instruction. The instruction header 320 also includes an indication of the instruction block size. The instruction block size can be in larger chunks of instructions than one, for example, the number of 4-instruction chunks contained within the instruction block. In other words, the size of the block is shifted 4 bits in order to compress header space allocated to specifying instruction block size. Thus, a size value of 0 indicates a minimally-sized instruction block which is a block header followed by four instructions. In some examples, the instruction block size is expressed as a number of bytes, as a number of words, as a number of n-word chunks, as an address, as an address offset, or using other suitable expressions for describing the size of instruction blocks. In some examples, the instruction block size is indicated by a terminating bit pattern in the instruction block header and/or footer.

The instruction block header 320 can also include execution flags, which indicate special instruction execution requirements. For example, branch prediction or memory dependence prediction can be inhibited for certain instruction blocks, depending on the particular application. As another example, an execution flag can be used to control whether the instruction block is executed in the default execution mode or the debug execution mode.

In some examples of the disclosed technology, the instruction header 320 includes one or more identification bits that indicate that the encoded data is an instruction header. For example, in some block-based processor ISAs, a single ID bit in the least significant bit space is always set to the binary value 1 to indicate the beginning of a valid instruction block. In other examples, different bit encodings can be used for the identification bit(s). In some examples, the instruction header 320 includes information indicating a particular version of the ISA for which the associated instruction block is encoded.

The block instruction header can also include a number of block exit types for use in, for example, branch prediction, control flow determination, and/or bad jump detection. The exit type can indicate what the type of branch instructions are, for example: sequential branch instructions, which point to the next contiguous instruction block in memory; offset instructions, which are branches to another instruction block at a memory address calculated relative to an offset; subroutine calls, or subroutine returns. By encoding the branch exit types in the instruction header, the branch predictor can begin operation, at least partially, before branch instructions within the same instruction block have been fetched and/or decoded.

The instruction block header 320 also includes a store mask which identifies the load-store queue identifiers that are assigned to store operations. The instruction block header can also include a write mask, which identifies which global register(s) the associated instruction block will write. The associated register file must receive a write to each entry before the instruction block can complete. In some examples a block-based processor architecture can include not only scalar instructions, but also single-instruction multiple-data (SIMD) instructions, that allow for operations with a larger number of data operands within a single instruction.

VI. Example Block Instruction Target Encoding

Figure 4:
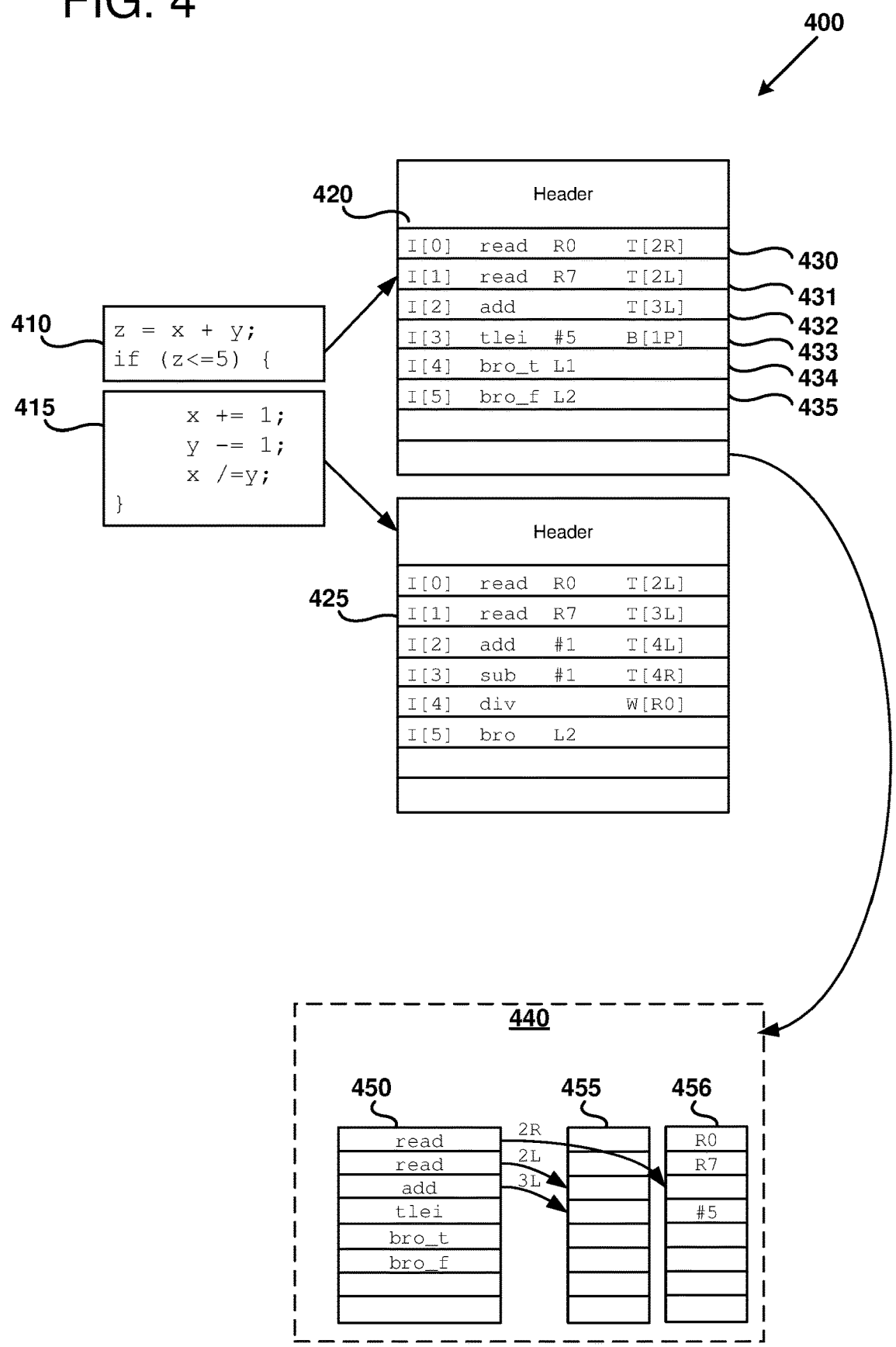
FIG. 4 illustrates portions of source code and respective instruction blocks.

FIG. 4 is a diagram 400 depicting an example of two portions 410 and 415 of C language source code and their respective instruction blocks 420 and 425 (in assembly language), illustrating how block-based instructions can explicitly encode their targets. The high-level C language source code can be translated to the low-level assembly language and machine code by a compiler whose target is a block-based processor. A high-level language can abstract out many of the details of the underlying computer architecture so that a programmer can focus on functionality of the program. In contrast, the machine code encodes the program according to the target computer's ISA so that it can be executed on the target computer, using the computer's hardware resources. Assembly language is a human-readable form of machine code.

In the following examples, the assembly language instructions use the following nomenclature: "I[<number>] specifies the number of the instruction within the instruction block where the numbering begins at zero for the instruction following the instruction header and the instruction number is incremented for each successive instruction; the operation of the instruction (such as READ, ADDI, DIV, and the like) follows the instruction number; optional values (such as the immediate value 1) or references to registers (such as R0 for register 0) follow the operation; and optional targets that are to receive the results of the instruction follow the values and/or operation. Each of the targets can be to another instruction, a broadcast channel to other instructions, or a register that can be visible to another instruction block when the instruction block is committed. An example of an instruction target is T[1R] which targets the right operand of instruction 1. An example of a register target is W[R0], where the target is written to register 0.

In the diagram 400, the first two READ instructions 430 and 431 of the instruction block 420 target the right (T[2R]) and left (T[2L]) operands, respectively, of the ADD instruction 432. In the illustrated ISA, the read instruction is the only instruction that reads from the global register file; however any instruction can target, the global register file. When the ADD instruction 432 receives the result of both register reads it will become ready and execute.

When the TLEI (test-less-than-equal-immediate) instruction 433 receives its single input operand from the ADD, it will become ready and execute. The test then produces a predicate operand that is broadcast on channel one (B[1P]) to all instructions listening on the broadcast channel, which in this example are the two predicated branch instructions (BRO_T 434 and BRO_F 435). The branch that receives a matching predicate will fire.

A dependence graph 440 for the instruction block 420 is also illustrated, as an array 450 of instruction nodes and their corresponding operand targets 455 and 456. This illustrates the correspondence between the block instructions 420, the corresponding instruction window entries, and the underlying dataflow graph represented by the instructions. Here decoded instructions READ 430 and READ 431 are ready to issue, as they have no input dependencies. As they issue and execute, the values read from registers R6 and R7 are written into the right and left operand buffers of ADD 432, marking the left and right operands of ADD 432 "ready." As a result, the ADD 432 instruction becomes ready, issues to an ALU, executes, and the sum is written to the left operand of TLEI 433.

As a comparison, a conventional out-of-order RISC or CISC processor would dynamically build the dependence graph at runtime, using additional hardware complexity, power, area and reducing clock frequency and performance. However, the dependence graph is known statically at compile time and an EDGE compiler can directly encode the producer-consumer relations between the instructions through the ISA, freeing the microarchitecture from rediscovering them dynamically. This can potentially enable a simpler microarchitecture, reducing area, power and boosting frequency and performance.

VII. Example Block-Based Instruction Formats

Figure 5:
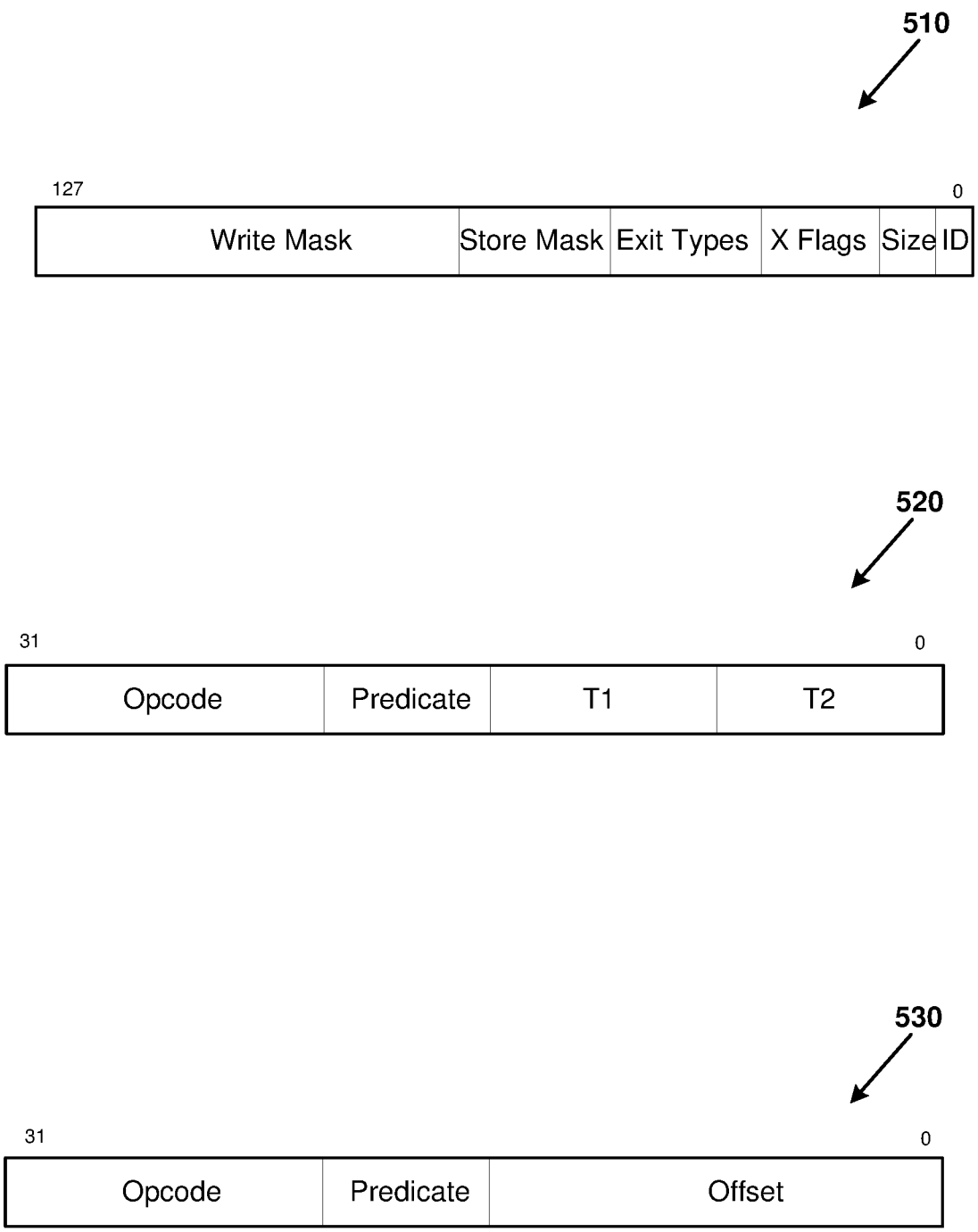
FIG. 5 illustrates block-based processor headers and instructions, as can be used in some examples of the disclosed technology.

FIG. 5 is a diagram illustrating generalized examples of instruction formats for an instruction header 510, a generic instruction 520, and a branch instruction 530. Each of the instruction headers or instructions is labeled according to the number of bits. For example the instruction header 510 includes four 32-bit words and is labeled from its least significant bit (lsb) (bit 0) up to its most significant bit (msb) (bit 127). As shown, the instruction header includes a write mask field, a store mask field, a number of exit type fields, a number of execution flag fields (X flags), an instruction block size field, and an instruction header ID bit (the least significant bit of the instruction header).

The execution flag fields can indicate special instruction execution modes. For example, an "inhibit branch predictor" flag can be used to inhibit branch prediction for the instruction block when the flag is set. As another example, an "inhibit memory dependence prediction" flag can be used to inhibit memory dependence prediction for the instruction block when the flag is set. As another example, a "break after block" flag can be used to halt an instruction thread and raise an interrupt when the instruction block is committed. As another example, a "break before block" flag can be used to halt an instruction thread and raise an interrupt when the instruction block header is decoded and before the instructions of the instruction block are executed. As another example, a "debug mode" flag can be used to control whether the instruction block is executed in the default execution mode or the debug execution mode.

The exit type fields include data that can be used to indicate the types of control flow and/or synchronization instructions encoded within the instruction block. For example, the exit type fields can indicate that the instruction block includes one or more of the following: sequential branch instructions, offset branch instructions, indirect branch instructions, call instructions, return instructions, and/or break instructions. In some examples, the branch instructions can be any control flow instructions for transferring control flow between instruction blocks, including relative and/or absolute addresses, and using a conditional or unconditional predicate. The exit type fields can be used for branch prediction and speculative execution in addition to determining implicit control flow instructions. In some examples, up to six exit types can be encoded in the exit type fields, and the correspondence between fields and corresponding explicit or implicit control flow instructions can be determined by, for example, examining control flow instructions in the instruction block.

The illustrated generic block instruction 520 is stored as one 32-bit word and includes an opcode field, a predicate field, a broadcast ID field (BID), a first target field (T1), and a second target field (T2). For instructions with more consumers than target fields, a compiler can build a fanout tree using move instructions, or it can assign high-fanout instructions to broadcasts. Broadcasts support sending an operand over a lightweight network to any number of consumer instructions in a core. A broadcast identifier can be encoded in the generic block instruction 520.

While the generic instruction format outlined by the generic instruction 520 can represent some or all instructions processed by a block-based processor, it will be readily understood by one of skill in the art that, even for a particular example of an ISA, one or more of the instruction fields may deviate from the generic format for particular instructions. The opcode field specifies the length or width of the instruction 520 and the operation(s) performed by the instruction 520, such as memory read/write, register load/store, add, subtract, multiply, divide, shift, rotate, system operations, or other suitable instructions. The predicate field specifies the condition under which the instruction will execute. For example, the predicate field can specify the value "true," and the instruction will only execute if a corresponding condition flag matches the specified predicate value. In some examples, the predicate field specifies, at least in part, which is used to compare the predicate, while in other examples, the execution is predicated on a flag set by a previous instruction (e.g., the preceding instruction in the instruction block). In some examples, the predicate field can specify that the instruction will always, or never, be executed. Thus, use of the predicate field can allow for denser object code, improved energy efficiency, and improved processor performance, by reducing the number of branch instructions.

The target fields T1 and T2 specifying the instructions to which the results of the block-based instruction are sent. For example, an ADD instruction at instruction slot 5 can specify that its computed result will be sent to instructions at slots 3 and 10. Depending on the particular instruction and ISA, one or both of the illustrated target fields can be replaced by other information, for example, the first target field T1 can be replaced by an immediate operand, an additional opcode, specify two targets, etc.

The branch instruction 530 includes an opcode field, a predicate field, a broadcast ID field (BID), and an offset field. The opcode and predicate fields are similar in format and function as described regarding the generic instruction. The offset can be expressed in units of four instructions, thus extending the memory address range over which a branch can be executed. The predicate shown with the generic instruction 520 and the branch instruction 530 can be used to avoid additional branching within an instruction block. For example, execution of a particular instruction can be predicated on the result of a previous instruction (e.g., a comparison of two operands). If the predicate is false, the instruction will not commit values calculated by the particular instruction. If the predicate value does not match the required predicate, the instruction does not issue. For example, a BRO_F (predicated false) instruction will issue if it is sent a false predicate value.

It should be readily understood that, as used herein, the term "branch instruction" is not limited to changing program execution to a relative memory location, but also includes jumps to an absolute or symbolic memory location, subroutine calls and returns, and other instructions that can modify the execution flow. In some examples, the execution flow is modified by changing the value of a system register (e.g., a program counter PC or instruction pointer), while in other examples, the execution flow can be changed by modifying a value stored at a designated location in memory. In some examples, a jump register branch instruction is used to jump to a memory location stored in a register. In some examples, subroutine calls and returns are implemented using jump and link and jump register instructions, respectively.

VIII. Example States of a Processor Core

FIG. 6 is a flowchart illustrating an example of a progression of states 600 of a processor core of a block-based computer. The block-based computer is composed of multiple processor cores that are collectively used to run or execute a software program. The program can be written in a variety of high-level languages and then compiled for the block-based processor using a compiler that targets the block-based processor. The compiler can emit code that, when run or executed on the block-based processor, will perform the functionality specified by the high-level program. The compiled code can be stored in a computer-readable memory that can be accessed by the block-based processor. The compiled code can include a stream of instructions grouped into a series of instruction blocks. During execution, one or more of the instruction blocks can be executed by the block-based processor to perform the functionality of the program. Typically, the program will include more instruction blocks than can be executed on the cores at any one time. Thus, blocks of the program are mapped to respective cores, the cores perform the work specified by the blocks, and then the blocks on respective cores are replaced with different blocks until the program is complete. Some of the instruction blocks may be executed more than once, such as during a loop or a subroutine of the program. An "instance" of an instruction block can be created for each time the instruction block will be executed. Thus, each repetition of an instruction block can use a different instance of the instruction block. As the program is run, the respective instruction blocks can be mapped to and executed on the processor cores based on architectural constraints, available hardware resources, and the dynamic flow of the program. During execution of the program, the respective processor cores can transition through a progression of states 600, so that one core can be in one state and another core can be in a different state.

At state 605, a state of a respective processor core can be unmapped. An unmapped processor core is a core that is not currently assigned to execute an instance of an instruction block. For example, the processor core can be unmapped before the program begins execution on the block-based computer. As another example, the processor core can be unmapped after the program begins executing but not all of the cores are being used. In particular, the instruction blocks of the program are executed, at least in part, according to the dynamic flow of the program. Some parts of the program may flow generally serially or sequentially, such as when a later instruction block depends on results from an earlier instruction block. Other parts of the program may have a more parallel flow, such as when multiple instruction blocks can execute at the same time without using the results of the other blocks executing in parallel. Fewer cores can be used to execute the program during more sequential streams of the program and more cores can be used to execute the program during more parallel streams of the program.

At state 610, the state of the respective processor core can be mapped. A mapped processor core is a core that is currently assigned to execute an instance of an instruction block. When the instruction block is mapped to a specific processor core, the instruction block is in-flight. An in-flight instruction block is a block that is targeted to a particular core of the block-based processor, and the block will be or is executing, either speculatively or non-speculatively, on the particular processor core. In particular, the in-flight instruction blocks correspond to the instruction blocks mapped to processor cores in states 610-650. A block executes non-speculatively when it is known during mapping of the block that the program will use the work provided by the executing instruction block. A block executes speculatively when it is not known during mapping whether the program will or will not use the work provided by the executing instruction block. Executing a block speculatively can potentially increase performance, such as when the speculative block is started earlier than if the block were to be started after or when it is known that the work of the block will be used. However, executing speculatively can potentially increase the energy used when executing the program, such as when the speculative work is not used by the program.

A block-based processor includes a finite number of homogeneous or heterogeneous processor cores. A typical program can include more instruction blocks than can fit onto the processor cores. Thus, the respective instruction blocks of a program will generally share the processor cores with the other instruction blocks of the program. In other words, a given core may execute the instructions of several different instruction blocks during the execution of a program. Having a finite number of processor cores also means that execution of the program may stall or be delayed when all of the processor cores are busy executing instruction blocks and no new cores are available for dispatch. When a processor core becomes available, an instance of an instruction block can be mapped to the processor core.

An instruction block scheduler can assign which instruction block will execute on which processor core and when the instruction block will be executed. The mapping can be based on a variety of factors, such as a target energy to be used for the execution, the number and configuration of the processor cores, the current and/or former usage of the processor cores, the dynamic flow of the program, whether speculative execution is enabled, a confidence level that a speculative block will be executed, and other factors. An instance of an instruction block can be mapped to a processor core that is currently available (such as when no instruction block is currently executing on it). In one embodiment, the instance of the instruction block can be mapped to a processor core that is currently busy (such as when the core is executing a different instance of an instruction block) and the later-mapped instance can begin when the earlier-mapped instance is complete.

At state 620, the state of the respective processor core can be fetch. For example, the IF pipeline stage of the processor core can be active during the fetch state. Fetching an instruction block can include transferring the block from memory (such as the L1 cache, the L2 cache, or main memory) to the processor core, and reading instructions from local buffers of the processor core so that the instructions can be decoded. For example, the instructions of the instruction block can be loaded into an instruction cache, buffer, or registers of the processor core. Multiple instructions of the instruction block can be fetched in parallel (e.g., at the same time) during the same clock cycle. The fetch state can be multiple cycles long and can overlap with the decode (630) and execute (640) states when the processor core is pipelined.

When instructions of the instruction block are loaded onto the processor core, the instruction block is resident on the processor core. The instruction block is partially resident when some, but not all, instructions of the instruction block are loaded. The instruction block is fully resident when all instructions of the instruction block are loaded. The instruction block will be resident on the processor core until the processor core is reset or a different instruction block is fetched onto the processor core. In particular, an instruction block is resident in the processor core when the core is in states 620-670.

At state 630, the state of the respective processor core can be decode. For example, the DC pipeline stage of the processor core can be active during the fetch state. During the decode state, instructions of the instruction block are being decoded so that they can be stored in the memory store of the instruction window of the processor core. In particular, the instructions can be transformed from relatively compact machine code, to a less compact representation that can be used to control hardware resources of the processor core. The decode state can be multiple cycles long and can overlap with the fetch (620) and execute (640) states when the processor core is pipelined. After an instruction of the instruction block is decoded, it can be executed when all dependencies of the instruction are met.

At state 640, the state of the respective processor core can be execute. The execute state can include various modes of operation, such as a default execution mode and a debug mode. During the default mode of the execute state, instructions of the instruction block are being executed. In particular, the EX and/or LS pipeline stages of the processor core can be active during the execute state. The instruction block can be executing speculatively or non-speculatively. A speculative block can execute to completion or it can be terminated prior to completion, such as when it is determined that work performed by the speculative block will not be used. When an instruction block is terminated, the processor can transition to the abort state. A speculative block can complete when it is determined the work of the block will be used, all register writes are buffered, all writes to memory are buffered, and a branch target is calculated, for example. A non-speculative block can execute to completion when all register writes are buffered, all writes to memory are buffered, and a branch target is calculated, for example. The execute state can be multiple cycles long and can overlap with the fetch (620) and decode (630) states when the processor core is pipelined. When the instruction block is complete, the processor can transition to the commit state.

During the debug mode of the execute state, instructions of the instruction block can be single-stepped or executed one at a time. For example, the processor core can be halted in the debug mode of the execute state, such as when a control signal is asserted or when the instruction header specifies that the debug mode is to be used for the instruction block. Upon receiving an indication to perform a single-step operation, one instruction of the instruction block can be executed. The intermediate state of the processor core can be scanned or read out of the processor core. The process can be repeated for the next instruction of the instruction block upon receiving another indication to perform a single-step operation. The "next" instruction can be determined based on a compiler-generated order, a scheduler-generated order, or an order generated outside of the processor core (such as by debug software running on a different core). The instructions of the block can continue to be single-stepped until the commit conditions are met, and then the processor can transition to the commit state.

At state 650, the state of the respective processor core can be commit or abort. During commit, the work of the instructions of the instruction block can be atomically committed so that other blocks can use the work of the instructions. In particular, the commit state can include a commit phase where locally buffered architectural state is written to architectural state that is visible to or accessible by other processor cores. When the visible architectural state is updated, a commit signal can be issued and the processor core can be released so that another instruction block can be executed on the processor core. During the abort state, the pipeline of the core can be halted to reduce dynamic power dissipation. In some applications, the core can be power gated to reduce static power dissipation. At the conclusion of the commit/abort states, the processor core can receive a new instruction block to be executed on the processor core, the core can be refreshed, the core can be idled, or the core can be reset.

At state 660, it can be determined if the instruction block resident on the processor core can be refreshed. As used herein, an instruction block refresh or a processor core refresh means enabling the processor core to re-execute one or more instruction blocks that are resident on the processor core. In one embodiment, refreshing a core can include resetting the active-ready state for one or more instruction blocks. It may be desirable to re-execute the instruction block on the same processor core when the instruction block is part of a loop or a repeated sub-routine or when a speculative block was terminated and is to be re-executed. The decision to refresh can be made by the processor core itself (contiguous reuse) or by outside of the processor core (non-contiguous reuse). For example, the decision to refresh can come from another processor core or a control core performing instruction block scheduling. There can be a potential energy savings when an instruction block is refreshed on a core that already executed the instruction as opposed to executing the instruction block on a different core. Energy is used to fetch and decode the instructions of the instruction block, but a refreshed block can save most of the energy used in the fetch and decode states by bypassing these states. In particular, a refreshed block can re-start at the execute state (640) because the instructions have already been fetched and decoded by the core. When a block is refreshed, the decoded instructions and the decoded ready state can be maintained while the active ready state is cleared. The decision to refresh an instruction block can occur as part of the commit operations or at a later time. If an instruction block is not refreshed, the processor core can be idled.

At state 670, the state of the respective processor core can be idle. The performance and power consumption of the block-based processor can potentially be adjusted or traded off based on the number of processor cores that are active at a given time. For example, performing speculative work on concurrently running cores may increase the speed of a computation but increase the power if the speculative mis-prediction rate is high. As another example, immediately allocating new instruction blocks to processors after committing or aborting an earlier executed instruction block may increase the number of processors executing concurrently, but may reduce the opportunity to reuse instruction blocks that were resident on the processor cores. Reuse may be increased when a cache or pool of idle processor cores is maintained. For example, when a processor core commits a commonly used instruction block, the processor core can be placed in the idle pool so that the core can be refreshed the next time that the same instruction block is to be executed. As described above, refreshing the processor core can save the time and energy used to fetch and decode the resident instruction block. The instruction blocks/processor cores to place in an idle cache can be determined based on a static analysis performed by the compiler or a dynamic analysis performed by the instruction block scheduler. For example, a compiler hint indicating potential reuse of the instruction block can be placed in the header of the block and the instruction block scheduler can use the hint to determine if the block will be idled or reallocated to a different instruction block after committing the instruction block. When idling, the processor core can be placed in a low-power state to reduce dynamic power consumption, for example.

At state 680, it can be determined if the instruction block resident on the idle processor core can be refreshed. If the core is to be refreshed, the block refresh signal can be asserted and the core can transition to the execute state (640). If the core is not going to be refreshed, the block reset signal can be asserted and the core can transition to the unmapped state (605). When the core is reset, the core can be put into a pool with other unmapped cores so that the instruction block scheduler can allocate a new instruction block to the core.

IX. Examples of Block-Based Compiler Methods

Figure 7A:
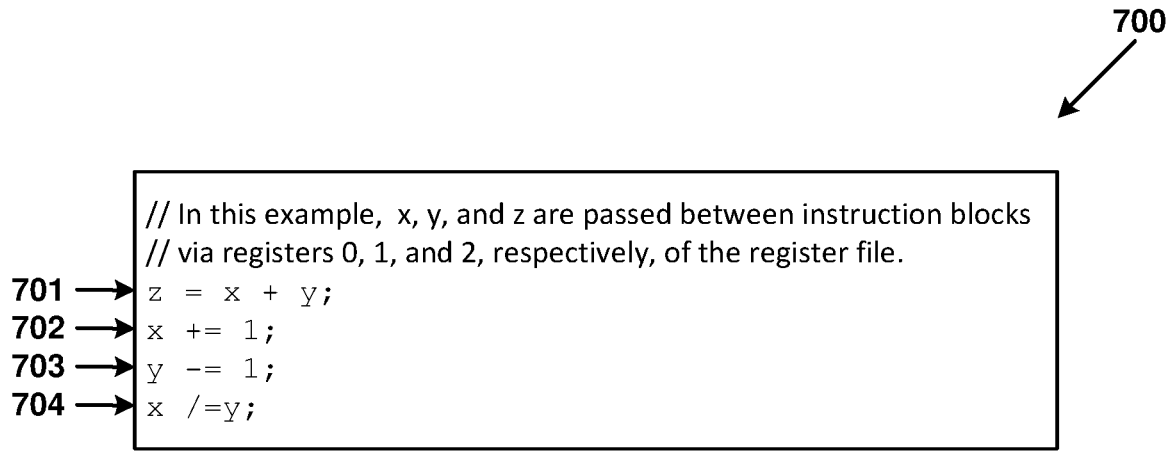
FIG. 7A is an example snippet of source code of a program for a block-based processor.
Figure 7B:
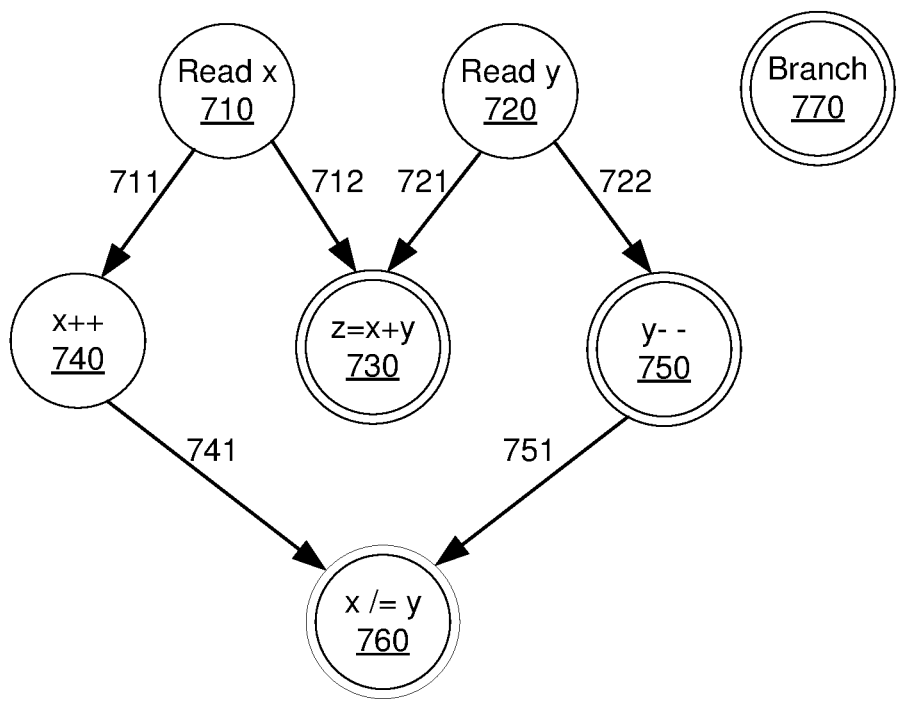
FIG. 7B is an example of a dependence graph of the example snippet of source code from FIG. 7A.

FIG. 7A is an example snippet of source code 700 of a program for a block-based processor. FIG. 7B is an example of a dependence graph 705 of the example snippet of source code 700. In this example, the variables x, y, and z are updated using the source code statements 701-704. The source code 700 can be compiled or transformed into an instruction block that can be atomically executed on a processor core of a block-based processor.

Compiling the source code can include generating the dependence graph 705 by analyzing the source code 700, and emitting instructions of the instruction block using the dependence graph 705. The dependence graph 705 can be a single directed acyclic graph (DAG) or a forest of DAGs. The nodes (e.g., 710, 720, and 730) of the dependence graph 705 can represent operations to perform the function of the source code 700. For example, the nodes can directly correspond to operations to be performed by the processor core. Alternatively, the nodes can correspond to macro- or micro-operations to be performed by the processor core. The directed edges (e.g., 711, 712, and 721) connecting the nodes represent dependencies between the nodes. Specifically, consumer or target nodes are dependent on producer nodes generating a result, and thus producer nodes are executed before consumer nodes. The directed edges point from the producer node to the consumer node. In the block-atomic execution model, intermediate results are visible only within the processor core and final results are made visible to all of the processor cores when the instruction block is committed. The nodes producing intermediate results (710, 720, and 740) are illustrated using single circles and the nodes producing final results (730, 750, 760, and 770) are illustrated using double circles.

As a specific example, the dependence graph 705 can be generated from at least the snippet of source code 700. The statement 701 generates three nodes (710, 720, and 730) of the dependence graph 705. The node 710 represents that the value of the variable x is read from a register or memory location. Similarly, the node 720 represents that the value of the variable y is read from a register or memory location. The values of x and y are consumed by the node 730 as represented by the edges 712 and 721, respectively. The node 730 represents that the values of x and y are added to generate the value stored in variable z. The statement 702 can generate the node 740 representing that the value of x is incremented. The node 740 consumes the value of x from node 710, as shown by edge 711, and the node 740 produces the value of x for node 760, as shown by edge 741. The statement 703 can generate the node 750 representing that the value of y is decremented. The node 750 consumes the value of y from node 720, as shown by edge 722, and the node 750 produces the value of y for node 760, as shown by edge 751. The statement 704 can generate the node 760 representing that the value of x is divided by the value of y to generate a new value for the variable x. The nodes corresponding to the statements 701-704 are a first DAG of the dependence graph 705.

The node 770 does not directly correspond to any of the source code statements 701-704, but is generated as a consequence of the source code statements 701-704 being grouped within an instruction block. In some examples of the disclosed technology, an instruction block will have at least one branch to another instruction block of the program. The node 770 represents the branch to the next instruction block. The branch is not conditional on any of the other nodes of the dependence graph 705. The node 770 is a second DAG of the dependence graph 705 that is unconnected to the first DAG of the dependence graph 705.

Compiling the source code 700 can include emitting instructions of the instruction block in a particular order. In a conventional non-block-based processor, dependencies between instructions are maintained by the ordering of the instructions, such that dependent instructions must come after the instructions they depend upon. In contrast, the instructions within an instruction block to be executed on a block-based processor can be emitted in any order because the dependencies are encoded within the instructions themselves and not in the order of the instructions. Specifically, the instruction scheduling logic of the block-based processor can ensure the proper order of execution because the scheduling logic will only issue instructions for execution when the dependencies of the instructions are satisfied. Thus, a compiler targeting a block-based processor may have more degrees of freedom in which to order the emitted instructions within the instruction block. For example, the instructions can be ordered based on various criteria, such as: a size of the instruction when the instructions have variable lengths (so that like-sized instructions are grouped together or so that the instructions maintain a particular alignment within the instruction block); a mapping of machine code instructions to source code statements; a type of the instruction (so that like-type instructions (e.g., having the same opcode) are grouped together or some types of instructions are ordered before other types); and/or a traversal of the dependence graph 705. As specific examples of different orderings, FIGS. 8A and 8B illustrate two different orderings of instructions for instruction blocks, where the instructions are generated for the same source code 700.

Figures 8A, 8B:
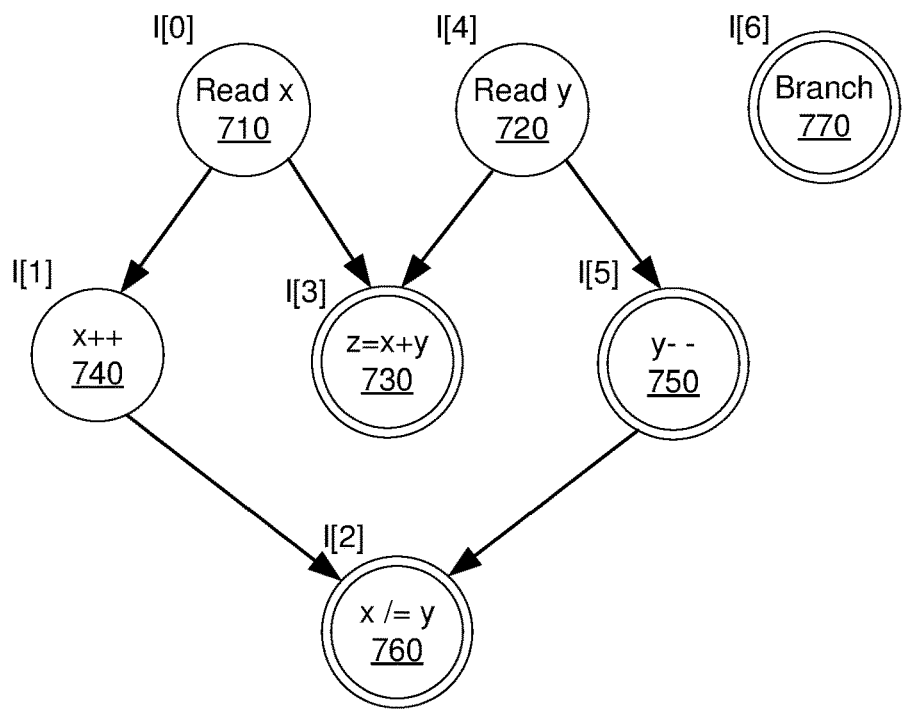
FIG. 8A is an example instruction block corresponding to the snippet of source code from FIG. 7A.
FIG. 8B is an example of a dependence graph of the example snippet of source code from FIG. 7A annotated with references to the instructions of the instruction block of FIG. 8A.

FIG. 8A is an example instruction block 800 corresponding to the snippet of source code 700 from FIG. 7A. FIG. 8B is an example of an annotated dependence graph 805 generated by annotating the dependence graph 705 with references to the instructions of the instruction block 800. Specifically, the annotated dependence graph 805 is generated by performing a depth-first traversal of the dependence graph 705. The traversal begins with node 710 and the read instruction I[0] is emitted for the instruction block 800. The next node in the traversal is the node 740 and the add immediate instruction I[1] is emitted for the instruction block 800. The traversal continues as shown by the annotation of the annotated dependence graph 805 until all of the nodes are traversed. In this example, a pad instruction performing no operation is added to the instruction block 800 at location seven so that the number of instructions is divisible by four.

The dependencies of the instructions are encoded within the instructions themselves. For example, the instructions I[1] and I[3] are dependent on the result of the I[0] read instruction. In other words, the result of the I[0] read instruction is targeted to operands of the instructions I[1] and I[3] via the target outputs T[1R] and T[3L], respectively, of the instruction I[0]. The instructions of the instruction block 800 include both forward and reverse references to targeted instructions. A forward reference is a reference to an instruction with a higher instruction number, whereas a backward or reverse reference is a reference to an instruction with a lower instruction number. For example, the instruction I[0] includes only forward references to instructions I[1] and I[3], but the instruction I[4] includes both a forward reference to instruction I[5] (via the T[5R] output) and a reverse reference to instruction I[3] (via the T[3R] output).

During the default execution mode, the instructions can execute in a number of different orders based on when the scheduling logic issues each of the instructions for execution. The instruction scheduling logic will only issue instructions for execution when the dependencies of the instructions are satisfied. Thus, instruction I[4] will issue before instruction I[3] and instruction I[5] will issue before instruction I[2]. Instructions I[0], I[4], and I[6] can issue in any order since there are no dependencies for these instructions. Having the flexibility to issue instructions in different orders can be useful during default operation because instructions that are ready can bypass stalled instructions, potentially resulting in faster execution of the instruction block. However, when a programmer is debugging a program, the programmer may desire that the instructions be issued in a deterministic order so that it may be easier to comprehend the behavior of the program. For example, one debug technique is to single-step through a program so that the effect of each instruction can be observed. However, single-stepping through a block-based program can be complicated when the instructions are not issued in a deterministic order and because intermediate values of the block are not visible outside of the processor core where the instruction block is executing. As described herein, during a debug mode, instructions of a block-based program can be issued in a consistent, deterministic order and intermediate values of the block can be made visible outside of the processor core using a data-path reserved for debugging. Initially, FIGS. 9A and 9B illustrate one example of how instructions can be ordered for execution so that the instructions can execute in a deterministic order during single-step debugging.

Figures 9A, 9B:
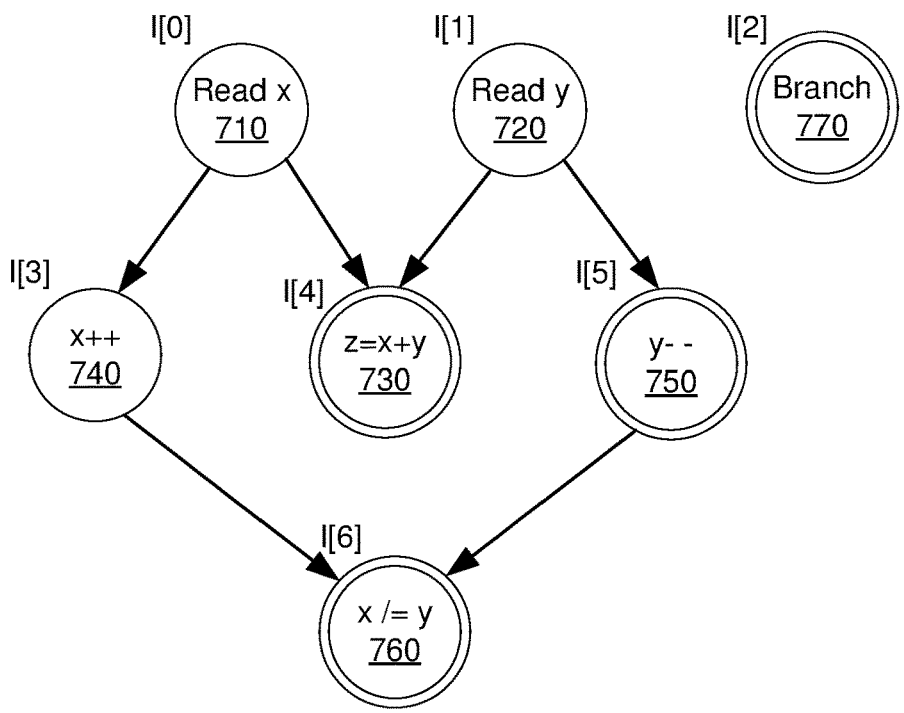
FIG. 9A is another example instruction block corresponding to the snippet of source code from FIG. 7A.
FIG. 9B is an example of a dependence graph of the example snippet of source code from FIG. 7A annotated with references to the instructions of the instruction block of FIG. 9A.

FIG. 9A is another example instruction block corresponding to the snippet of source code 700 from FIG. 7A. FIG. 9B is an example of an annotated dependence graph 905 generated by annotating the dependence graph 705 with references to the instructions of the instruction block 900. Specifically, the annotated dependence graph 905 is generated by performing a breadth-first traversal of the dependence graph 705. A first phase of the traversal includes identifying any nodes that have no dependencies. Specifically, the nodes 710, 720, and 770 are traversed resulting in the instructions I[0], I[1], and I[2], respectively, being emitted for the instruction block 900. It should be noted that within a given phase of the traversal, the instructions corresponding to the traversed nodes can be emitted in any order. Specifically, there are three factorial (3!) possible orderings for the three instructions from the first phase. The next phase of the traversal includes identifying any nodes that only have dependencies from nodes that have been previously traversed in an earlier phase of the traversal. Specifically, the nodes 740, 730, and 750 are traversed resulting in the instructions I[3], I[4], and I[5], respectively, being emitted for the instruction block 900. The phases of the traversal can continue until there are no nodes left to traverse. In the final phase of the traversal, the node 760 is traversed resulting in the instruction I[6] being emitted for the instruction block 900. The instruction I[7] is a pad instruction used for alignment of the instruction block 900. In this example, the dependence graph 705 includes two DAGs, where the node 770 is one DAG and the other nodes and their edges form a second unconnected DAG. The breadth-first traversal can be performed separately for each DAG. For example, the node 770 can be traversed before or after the primary DAG is traversed.

None of the instructions of the instruction block 900 have backwards references to instruction targets. In other words, the instructions either have no reference to an instruction target (e.g., the I[2] branch instruction, the I[4] add instruction, the I[6] div instruction, and the I[7] nop instruction) or a forward reference to an instruction target (e.g., the I[0] and I[1] read instructions, the I[3] add immediate instruction, and the I[5] subtract immediate instruction). Thus, any dependency of any instruction of the instruction block 900 will be from an instruction earlier in the order. During a debug mode of the block-based processor core, the instructions of the instruction block 900 can be sequentially executed because the operands for every instruction will be ready before the instructions are executed. In contrast, the instructions of the instruction block 800 cannot be sequentially executed because the operands for the instructions targeted through reverse references (e.g., I[2] and I[3]) will not be ready if the instructions are executed sequentially. As described below, the instruction execution order can be determined based on a compiler-generated order, a scheduler-generated order, or an order generated outside of the processor core (such as by debug software running on a different core).

Figure 10:
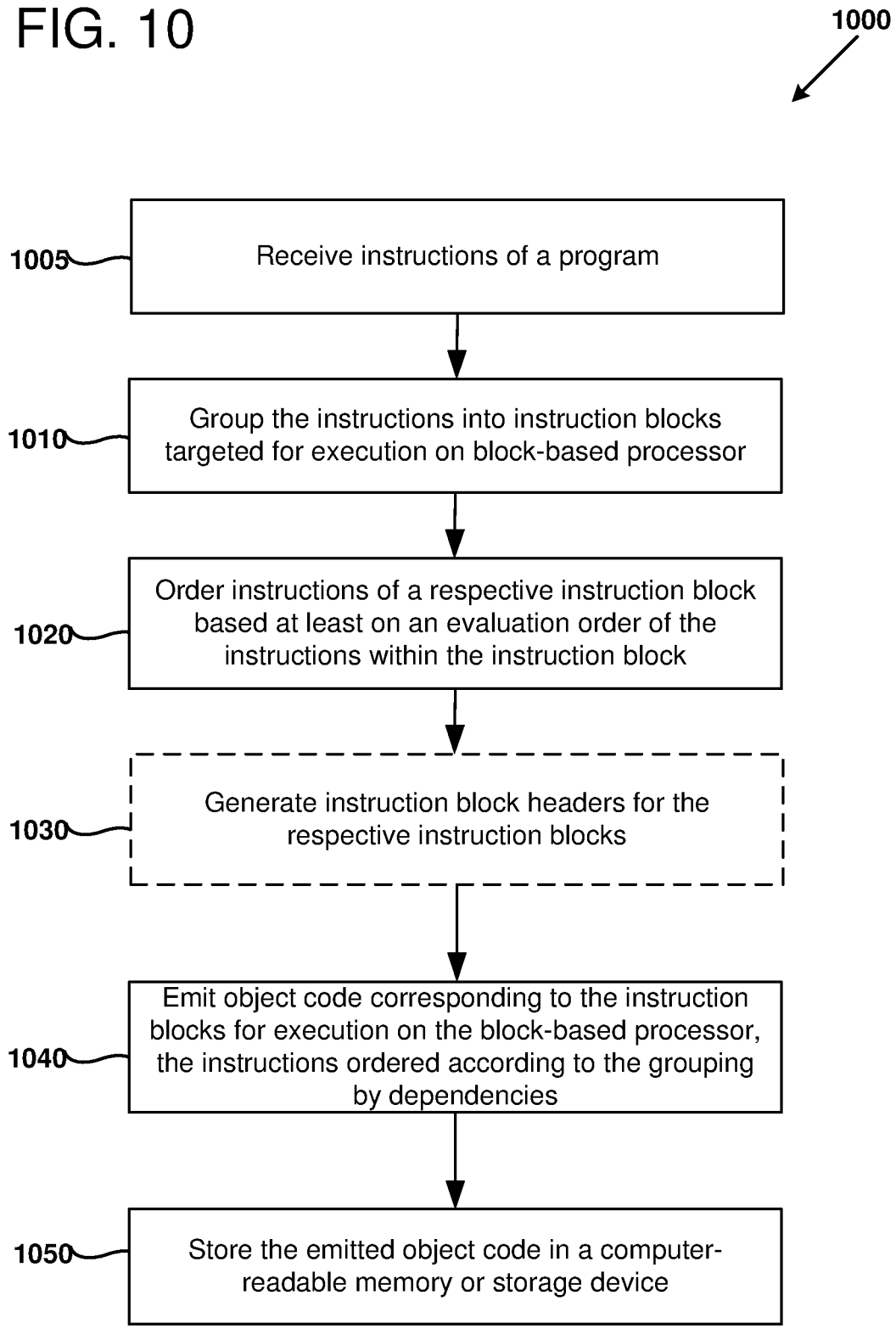
FIG. 10 is a flowchart illustrating an example method of compiling a program for a block-based processor, as can be performed in some examples of the disclosed technology.

FIG. 10 is a flowchart illustrating an example method 1000 for compiling a program for a block-based computer architecture. The method 1000 can be implemented in software of a compiler executing on a block-based processor or a conventional processor. The compiler can transform high-level source code (such as C, C++, or Java) of a program, in one or more phases or passes, into low-level object or machine code that is executable on the targeted block-based processor. For example, the compiler phases can include: lexical analysis for generating a stream of tokens from the source code; syntax analysis or parsing for comparing the stream of tokens to a grammar of the source code language and generating a syntax or parse tree; semantic analysis for performing various static checks (such as type-checking, checking that variables are declared, and so forth) on the syntax tree and generating an annotated or abstract syntax tree; generation of intermediate code from the abstract syntax tree; optimization of the intermediate code; machine code generation for producing the machine code for the targeted processor from the intermediate code; and optimization of the machine code. The machine code can be emitted and stored into a memory of the block-based processor so that the block-based processor can execute the program.

At process block 1005, instructions of a program can be received. For example, the instructions can be received from a front-end of a compiler for transforming source code into machine code. Additionally or alternatively, the instructions can be loaded from a memory, a secondary storage device (such as a hard-disk drive), or from a communications interface (such as when the instructions are downloaded from a remote server computer). The instructions of the program may include metadata or data about the instructions, such as a break-point or a single-step starting point associated with an instruction. For example, the break-point can be identified by a user using debugger software or via a compiler directive embedded within source code of the program.

At process block 1010, the instructions can be grouped into instruction blocks targeted for execution on a block-based processor. For example, the compiler can generate machine code as a sequential stream of instructions which can be grouped into instruction blocks according to the block-based computer's hardware resources and the data and control flow of the code. For example, a given instruction block can include a single basic block, a portion of a basic block, or multiple basic blocks, so long as the instruction block can be executed within the constraints of the ISA and the hardware resources of the targeted computer. A basic block is a block of code where control can only enter the block at the first instruction of the block and control can only leave the block at the last instruction of the basic block. Thus, a basic block is a sequence of instructions that are executed together. Multiple basic blocks can be combined into a single instruction block using predicated instructions so that intra-instruction-block branches are converted to dataflow instructions.

The instructions can be grouped so that the resources of the processor cores are not exceeded and/or are efficiently utilized. For example, the processor cores can include a fixed number of resources, such as one or more instruction windows, a fixed number of load and store queue entries, and so forth. The instructions can be grouped to have fewer instructions per group than are available within an instruction window. For example, an instruction window may have storage capacity for 32 instructions, a first basic block may have 8 instructions, and the first basic block may conditionally branch to a second basic block having 23 instructions. The two basic blocks can be grouped together into one instruction block so that the grouping includes 31 instructions (less than the 32-instruction capacity) and the instructions of the second basic block are predicated on the branch condition being true. As another example, an instruction window may have storage capacity for 32 instructions and a basic block may have 38 instructions. The first 31 instructions can be grouped into one instruction block with an unconditional branch (the thirty-second instruction) and the next 7 instructions can be grouped into a second instruction block. As another example, an instruction window may have storage capacity for thirty-two instructions and a loop body may include eight instructions and be repeated three times. Grouping can include unrolling the loop by combining the multiple iterations of the loop body within a larger loop body. By unrolling the loop, the number of instructions within the instruction block can be increased and the instruction window resource can potentially be more efficiently utilized.

At process block 1020, instructions of a respective instruction block can be ordered based at least on an evaluation order of the instructions. For example, the instructions can be ordered so that all references to instruction targets of the instructions are forward references. As another example, the instructions can be ordered so that the instructions having no references to instruction targets are ordered before any of the instructions having references to instruction targets. Various techniques can be used to order the instructions based on the evaluation order of the instructions. For example, a dependence graph of the instruction block can be generated and the instructions can be ordered based on a breadth-first traversal of the dependence graph, such as described with reference to FIGS. 9A and 9B. As another example, the instructions can be ordered based on performing a separate breadth-first traversal of each unconnected DAG of the dependence graph. As another example, a list-based greedy algorithm can be used to order the instructions. In particular, all of the instructions of the instruction block can be added to a candidate list. The candidate list can be iterated on such that a given instruction can be taken from the candidate list and added to the end of the ordered instructions when there are no producer instructions for the given instruction remaining on the candidate list. The greedy algorithm is complete when there are no more instructions remaining on the candidate list.

The ordering of the instructions at process block 1020 can be used to provide a consistent, deterministic order for executing the instructions of the respective instruction block. For example, the ordering from process block 1020 can be used when a debug mode of a processor core is active so that the same ordering is followed every time the processor core is executing in the debug mode. In contrast, the execution order of the instructions during a default execution mode may vary dynamically from run to run because of variable instruction latencies caused by resource contention within and outside of the processor core. For example, memory read latencies may vary depending on whether a memory location is cached or not; access times to a processor-level register file may vary depending on how many processor cores are contending for the register file; multiple instructions from different instruction windows may contend for limited execution units within a processor core; and so on. During the default execution mode, the instruction issue or scheduling logic may schedule the instructions based on when dependencies of the instructions are satisfied and so variable instruction latencies can cause different instruction orderings. While different orderings during the default execution mode may potentially result in faster execution of the instruction block, different orderings during the debug mode can potentially confuse the programmer doing the debugging.

At process block 1030, an instruction block header can optionally be generated for a respective instruction block. For example, the instruction block header can be encoded in a format defined by the ISA of the targeted block-based processor. The instruction block header can include information for determining an operating mode of the processor core. For example, the instruction block header can include an execution flag for entering a debug mode when the respective instruction block is executed on the block-based processor. The debug mode execution flag can be asserted (e.g., encoded as a one) when a break-point or a single-step starting point is associated with an instruction of the respective instruction block. Alternatively, the debug mode execution flag can be de-asserted (e.g., encoded as a zero) when there is no break-point associated with any of the instructions of the respective instruction block. As one example, the asserted debug mode execution flag can indicate that the processor core is to enter the debug mode when the instruction header is decoded for the instruction block and before the first instruction of the instruction block is executed. As another example, the header can include an offset field, and the asserted debug mode execution flag can indicate that the processor core is to enter the debug mode after a number of instructions matching the offset are executed. For example, the offset can be specified in bytes, words, double-words, quad-words, or instructions. Thus, the instructions before the offset can be executed in the default execution mode and instructions at and after the offset can be executed in the debug mode.

At process block 1040, object code can be emitted for the instruction blocks targeted to be executed on the block-based processor. For example, the instruction blocks can be emitted in a format defined by the ISA of the targeted block-based processor. In one embodiment, a respective instruction block can be emitted so that the instructions sequentially follow the instruction header of the instruction block. The instructions can be emitted in the sequential order from 1020 in the locations immediately following the instruction header so that the instruction block can be stored in a contiguous section of memory. If the instructions are variable lengths, pad bytes can be inserted between the instructions to maintain a desired alignment, such as on word or double-word boundaries, for example. The different instruction blocks associated with a program can be emitted in various orders. As one example, the instruction blocks can be emitted in the order they are encountered when doing a depth-first or breadth-first traversal of a dependence graph of the program. In an alternative embodiment, the instruction headers can be emitted in one stream and the instructions can be emitted in a different stream.

At process block 1050, the emitted object code can be stored in a computer-readable memory or storage device. For example, the emitted object code can be stored into a memory of the block-based processor so that the block-based processor can execute the program. As another example, the emitted object code can be loaded onto a storage device, such as a hard-disk drive of the block-based processor so that the block-based processor can execute the program. At run-time, all or a portion of the emitted object code can be retrieved from the storage device and loaded into memory of the block-based processor so that the block-based processor can execute the program.

X. Example Debugging Architecture

Figure 11:
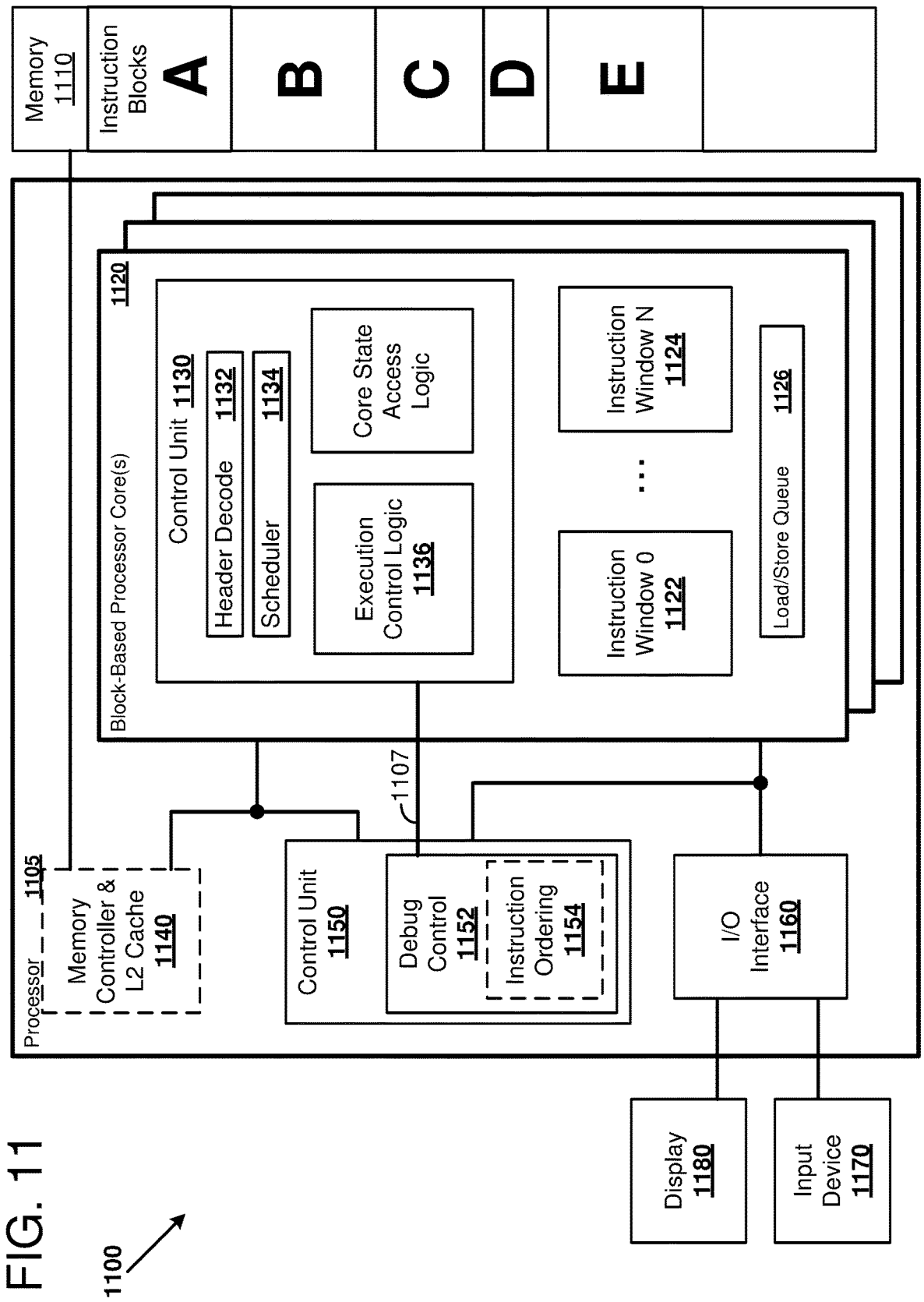
FIG. 11 is an example system for debugging an instruction block executing on a block-based processor core, as can be used in some examples of the disclosed technology.

FIG. 11 is an example architecture 1100 for debugging a program executing on a processor 1105. For example, the program can be compiled using the method 1000 of FIG. 10 to generate the instruction blocks A-E. The instruction blocks A-E can be stored in a memory 1110 that can be accessed by the processor 1105. The processor 1105 can include a plurality of block-based processor cores (including block-based processor core 1120), an optional memory controller and level-two (L2) cache 1140, a control unit 1150, and an input/output (I/O) interface 1160. The memory controller and level-two (L2) cache 1140 can be used to generate the control signals for communicating with the memory 1110 and to provide temporary storage for information coming from or going to the memory 1110. The control unit 1150 can be used for implementing all or a portion of a run-time environment for the program. For example, the control unit 1150 can be used for allocating processor cores to execute instruction blocks and for executing a debug control module 1152. Note that the block-based processor core 1120 includes a control unit 1130 having different functionality than the control unit 1150. The control unit 1130 includes logic for managing execution of an instruction block by the block-based processor core 1120. The I/O interface 1160 can be used for connecting the processor 1105 to various input devices (such as an input device 1170) and various output devices (such as a display 1180). In some examples, the control unit 1130, the memory controller and L2 cache 1140, the control unit 1150, and the I/O interface 1160 are implemented at least in part using one or more of: hardwired finite state machines, programmable microcode, programmable gate arrays, or other suitable control circuits. In some examples, the control unit 1150, and the I/O interface 1160 are implemented at least in part using an external computer (e.g., an off-chip processor executing control code and communicating with the processor 1105 via a communications interface (not shown)).

All or part of the program can be executed on the processor 1105 using a default execution mode. Specifically, the control unit 1150 can allocate one or more block-based processor cores, such as the processor core 1120, to execute the program. The control unit 1150 can communicate a starting address of an instruction block to the processor core 1120 so that the instruction block can be fetched from the memory 1110. Specifically, the processor core 1120 can issue a read request to the memory controller and L2 cache 1140 for the block of memory containing the instruction block. The memory controller and L2 cache 1140 can return the instruction block to the processor core 1120. The instruction block includes an instruction header and instructions. The instruction header can be decoded by the header decode logic 1132 to determine information about the instruction block, such as whether there are any asserted execution flags associated with the instruction block. If there are no special operating modes indicated by the instruction header, then the processor core 1120 can execute the instructions using the default execution mode. During the default execution mode, the instructions of the instruction block are scheduled dynamically for execution by the instruction scheduler logic 1134, based on when the instruction operands become available. As the instructions execute, intermediate values of the instruction block (such as operand buffers of instruction windows 1122 and 1124, and registers of a load/store queue 1126) are calculated and stored locally within state of the processor core 1120. The results of the instructions are committed atomically for the instruction block. Thus, the intermediate values generated by the processor core 1120 are not visible outside of the processor core 1120 and the final results (such as writes to the memory 1110 or to a global register file (not shown)) are released as a single transaction.

All or part of the program can be executed on the processor 1105 using a debug mode. For example, the program comprising the instruction blocks A-E can include a breakpoint in block C. The instruction blocks A, B, D, and E can execute using the default execution mode, and the block C can execute using the debug mode. As one example, the breakpoint can be added by a programmer prior to compilation, such as by using a compiler directive. The compiler can encode the breakpoint information into the instruction header of block C, such as by asserting a debug mode flag in the instruction header. During run-time, the processor core 1120 can detect that the debug mode is to be used for the instruction block when the instruction block header is decoded by the header decode logic 1132. As another example, the break-point can be added by a programmer after compilation, such as by using debug software running on the control unit 1150. Specifically, the control unit 1150 can cause the code to be presented on the display 1180 and the programmer can specify the breakpoint using the input device 1170. The control unit can record that a breakpoint is specified for block C, and at run-time, the control unit 1150 can detect that the instruction block C is to be loaded onto the block-based processor core 1120. The control unit 1150 can provide an indication (e.g., a control signal) that the debug mode is to be used for executing block C. The debug mode can be entered as the first instruction of the instruction block is executed, at an offset from the first instruction, or at the end of the instruction block.

Execution control logic 1136 can control an ordering of execution of instructions of an instruction block. During the default execution mode, the execution control logic 1136 can use the dynamic ordering provided by the instruction scheduler logic 1134. The dynamic ordering may enable faster execution of the instruction block compared to a static ordering because with dynamic ordering, instructions can be scheduled as soon as their dependencies are satisfied and ready instructions can potentially bypass stalled instructions. During the debug mode, the execution control logic 1136 can use a static ordering to single-step through the instructions of the instruction block. The static ordering is determined based on information that is available before the instruction block is executed whereas the dynamic ordering is determined based on conditions at run-time caused by the execution of the instructions of the instruction block. The static ordering can be generated by the compiler before the program is executed. Additionally or alternatively, the static ordering can be generated by an instruction ordering module 1154 of the control unit 1150 during run-time of the program. The static ordering can provide a consistent, deterministic order of execution which may potentially ease the task of debugging the program.

During the debug mode, the execution control logic 1136 can use a static ordering of execution for the instructions of the instruction block. As one example, the execution control logic 1136 can use a compiler-generated order. The compiler-generated order can be based at least on an evaluation order of the instructions, such as described in FIGS. 9A, 9B, and 10, for example. Specifically, all references to instruction targets of the instructions can be forward references. Thus, the execution control logic 1136 can sequentially execute the instructions in the order generated by the compiler without violating dependencies of the instructions. As another example, the execution control logic 1136 can use a static order generated by debug software, such as by the instruction ordering module 1154 of the debug control module 1152. The instruction ordering module 1154 can use the same algorithm as described in FIGS. 9A, 9B, and 10 to determine the execution order of the instruction block. During run-time, the debug control module 1152 can detect that an instruction block is associated with a breakpoint, and the debug control module 1152 can provide the execution control logic 1136 with information indicating which instruction of the instruction block to execute.

The debug control module 1152 can be used to control single-stepping of the instructions of the instruction block. Specifically, when the debug control module 1152 detects that an instruction block is associated with a breakpoint, the debug control module 1152 can pause or halt the program. The debug control module 1152 can cause the instructions of the instruction block to be displayed on the display 1180 along with an indication of where the program is paused. As one example, the instructions of the instruction block can be displayed according to a static order of the instructions. In some examples, the statically determined order to execute the instructions may differ from the compiler-generated order. For example, the compiler may order the instructions to increase a speed of fetching and decoding the instructions or the compiler may order the instructions to maintain an alignment of instructions within the instruction block. Thus, the static ordering generated by the instruction ordering module 1154 may differ from the compiler-generated order. When displaying the re-ordered instructions, references within an instruction to the other instructions are updated to reflect the static ordering of the instructions. As a specific example, the instructions in instruction blocks 800 and 900 are the same except for the references to target instructions. In other examples, the statically determined order to execute the instructions may be the same as the compiler-generated order.

The debug control module 1152 can halt the program and wait for user or programmer input. For example, the debug control module 1152 can wait for input from the input device 1170. The input can indicate that the next instruction in the instruction block is to be executed. Upon receiving the input, the debug control module 1152 can communicate an indication to perform a single-step operation to the block-based processor core 1120. In response, the execution control logic 1136 can initiate execution of the next instruction of the instruction block using the static ordering of execution for the instructions of the instruction block. The debug control module 1152 can update the display 1180 to show that the next instruction has been executed.

The debug control module 1152 can be used to observe and/or change intermediate results of the instructions of the instruction block. During the default execution mode, the intermediate results are not visible outside of the processor core 1120. However, during the debug mode, the intermediate results can be made available to the debug control module 1152 through a debug data-path 1107. In one example, the debug data-path 1107 can be a scan chain connected to the control unit 1150, and the intermediate state of the processor core 1120 can be collected by scanning the intermediate state through the scan chain. As a specific example, the intermediate state can be stored in scan registers that are serially connected in a scan path connected to the control unit 1150. The scan registers can include a capture mode for capturing the intermediate state and a scan mode for scanning the intermediate state out of the processor core 1120 and into the control unit 1150. The scan mode can also be used to scan in modified state from the control unit 1150 into the intermediate state of the processor core 1120. In another example, the debug data-path 1107 can be a bus or point-to-point interface connected to the control unit 1150, and the intermediate state of the processor core 1120 can be collected using read requests sent to the control unit 1150. For example, the intermediate state can be memory mapped and the control unit 1150 can issue a read request to the processor core 1120 for the memory location associated with the intermediate state. The intermediate state can be returned as a read response over the debug data-path 1107.

The intermediate state of the processor core 1120 can be modified using write requests sent to the processor core 1120 from the control unit 1150 over the debug data-path 1107. The debug control module 1152 can provide a portion or all of the intermediate state for display on the display 1180. The debug control module 1152 can receive instructions or commands from the user to change the intermediate state.

In sum, a program can potentially be debugged with the aid of debugging software running on the control unit 1150. The program can be started in default execution mode until a breakpoint of the program is reached. When the instruction block having the breakpoint is reached, the processor core 1120 can begin operating in a debug mode. The debug control unit 1152 can provide the instruction block to be displayed in the order that instructions will be single-step executed, which may be different than the compiler-generated order. The debug control unit 1152 can receive commands from a user (via the input device 1170) to control the single-stepping and to modify intermediate state. The debug control unit 1152 can provide the intermediate state for display by the display 1180. For example, the debug control unit 1152 can automatically provide the intermediate state for display by the display 1180 in response to performing a single-step operation. Thus, the programmer can single step through each instruction of the instruction block and see the intermediate results caused by each instruction. The programmer can experiment by changing the intermediate state to determine if a potential bug-fix may correct the program.

XI. Example Methods of Debugging an Instruction Block

Figure 12:
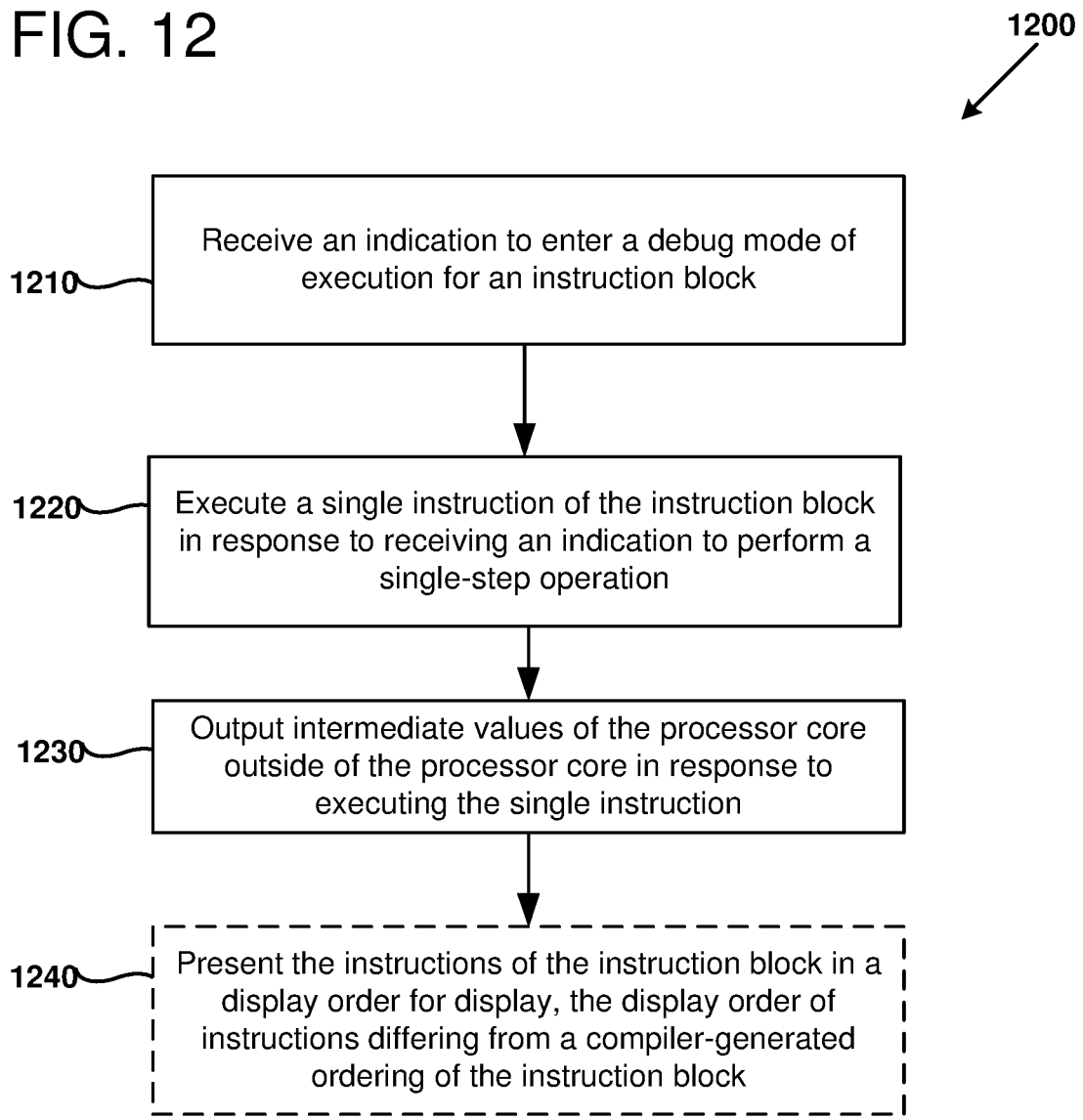
FIG. 12 is a flowchart illustrating an example method of debugging an instruction block executing on a block-based processor core, as can be performed in some examples of the disclosed technology.

FIG. 12 is a flowchart illustrating an example method 1200 of debugging an instruction block executing on a block-based processor core. For example, the method 1200 can be performed using the processor core 1120 when arranged in a system such as the system 1100 of FIG. 11. The block-based processor core is used to execute a program using a block-atomic execution model. The program includes one or more instruction blocks where each instruction block includes an instruction block header and a plurality of instructions. Using the block-atomic execution model, the individual instructions of the respective instruction blocks are executed and committed atomically so that final results of the instruction block are architecturally visible to other instruction blocks in a single transaction after a commit Intermediate results that are used to calculate a final result are not visible outside of the executing instruction block in the block-atomic execution model. When debugging a program compiled for a block-based processor, the program can begin by executing the instruction blocks using the default block-atomic execution mode. The program can enter a debug phase when an instruction block associated with a breakpoint is encountered, for example.

At process block 1210, an indication to enter a debug mode of execution for an instruction block is received. As one example, the indication to enter the debug mode of execution for the instruction block can be encoded in the instruction block header of the instruction block. The debug mode of execution can be entered in response to decoding the instruction block header and detecting the indication to enter the debug mode. As another example, the indication to enter the debug mode of execution for the instruction block can be caused by receiving an asserted control signal initiated from outside of the executing processor core. Specifically, the asserted control signal can be initiated by debug software executing on a control unit of the block-based processor. For example, the debug software can determine that the instruction block to be executed on the block-based processor core is associated with a breakpoint and cause the control signal to be asserted. Alternatively, the asserted control signal can be initiated by debug software executing on an external computer. For example, the external computer can snoop the memory bus and assert the control signal when the instruction block to debug is loaded from memory. When the debug mode is entered, the instruction block can pause or halt until a specific action is requested. In contrast, the instructions of the instruction block are automatically executed when the instruction block is loaded and the processor core is executing in the default execution mode.

At process block 1220, an indication to perform a single-step operation can be received. The indication can be an asserted control signal or a control message initiated from the debug software executing on a control unit of the block-based processor, for example. A control message can include a reference to the single instruction to execute, such as an address offset or an instruction number. In response to receiving the indication, a single instruction of the instruction block can be executed. The single instruction can be selected in sequence from a static ordering of the plurality of instructions of the instruction block. In contrast, the instructions are selected in sequence from a dynamic ordering of the plurality of instructions during the default execution mode, where the dynamic ordering is based on when operands of the instructions become available. As one example, the static ordering can be determined at compile-time and so the processor core can single-step through the instructions in the same order as the instructions are ordered by the compiler. However, the compiler may arrange the instructions in a different order to achieve different objectives, such as to optimize parallel fetch and decode of variable length instructions. Thus, the static ordering can be different from the compiler-generated order of the instructions. For example, the static ordering can be determined at run-time by the debug software executing on the control unit of the block-based processor. Specifically, the static ordering can be generated based on information that is available before the instructions of the instruction block are executed. As one example, the static ordering can be generated according to a breadth-first traversal of a dependence graph of the instruction block. As another example, the static ordering can be generated according to an algorithm that orders the instructions so that any targets to instructions are forward references to later instructions in the order.

At process block 1230, intermediate values of the processor core can be output outside of the processor core in response to executing the single instruction during the debug mode of execution. For example, the intermediate values can be output to a control unit of the block-based processor or to an external computer running debug software. In contrast, the intermediate values are not visible outside of the processor core when they are generated during the default execution mode. For example, the intermediate values of the processor core can be captured and scanned out of the processor core using a non-destructive scan chain. The scan chain can be a data-path that is only active during the debug mode. As another example, the intermediate values of the processor core can be retrieved using read requests to the processor core over a debug bus or point-to-point interface. The intermediate values can be provided for display to a user or programmer.

At optional process block 1240, the plurality of instructions can be presented for display in a display order. The display order can match the static ordering of the plurality of instructions and differ from the compiler-generated ordering of the plurality of instructions. When the display order differs from the compiler-generated order, references to other instructions (e.g., the instruction targets) within a given instruction can be adjusted to account for the static order of the instructions. Thus, the programmer can be provided with the order of the instructions as they will be executed during the debug mode, which in combination with the intermediate results, can aid the programmer in debugging the program.

XII. Example Computing Environment

Figure 13:
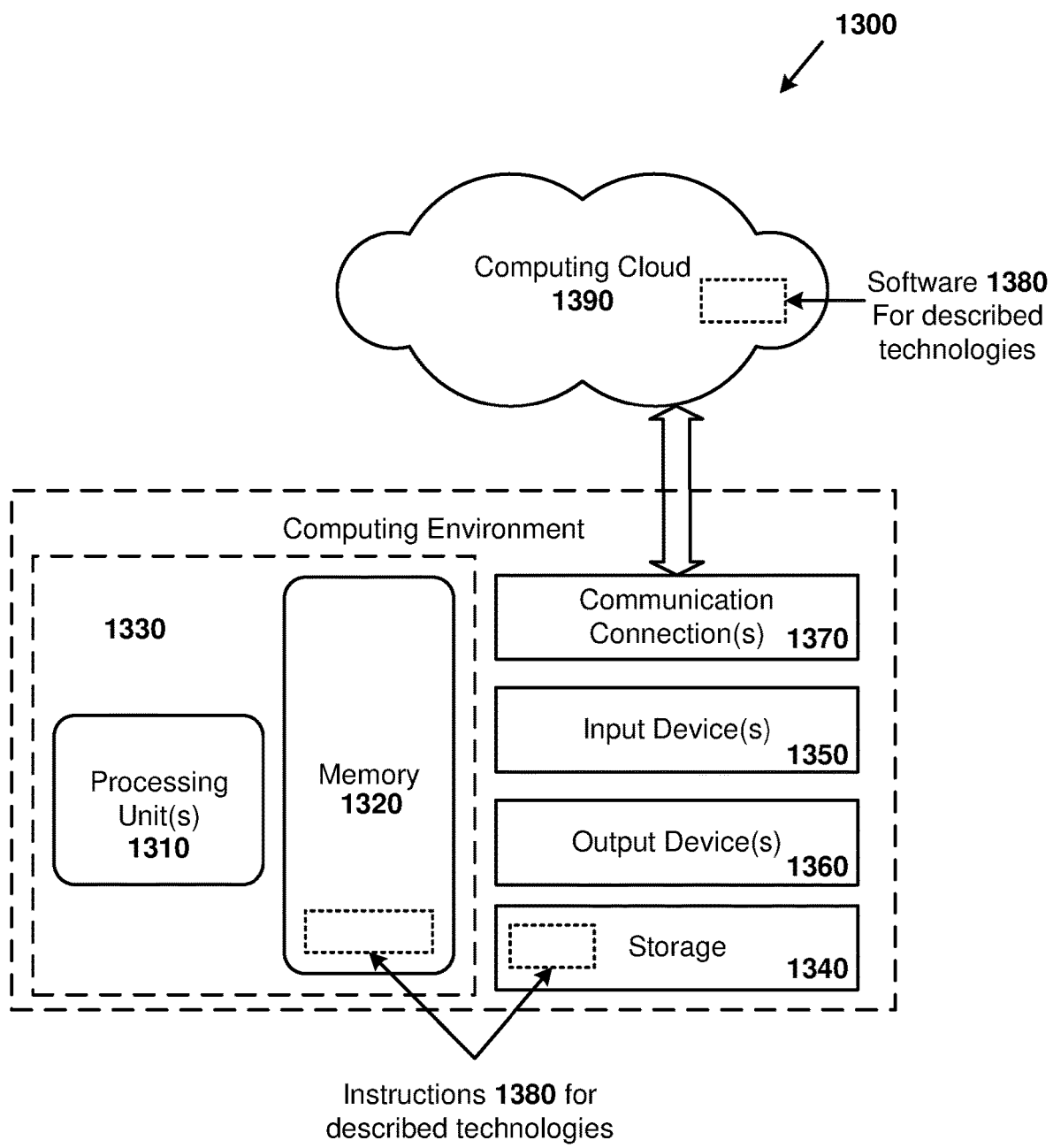
FIG. 13 is a block diagram illustrating a suitable computing environment for implementing some embodiments of the disclosed technology.

FIG. 13 illustrates a generalized example of a suitable computing environment 1300 in which described embodiments, techniques, and technologies, including supporting debugging of an instruction block targeted for a block-based processor, can be implemented.

The computing environment 1300 is not intended to suggest any limitation as to scope of use or functionality of the technology, as the technology may be implemented in diverse general-purpose or special-purpose computing environments. For example, the disclosed technology may be implemented with other computer system configurations, including hand held devices, multi-processor systems, programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules (including executable instructions for block-based instruction blocks) may be located in both local and remote memory storage devices.

With reference to FIG. 13, the computing environment 1300 includes at least one block-based processing unit 1310 and memory 1320. In FIG. 13, this most basic configuration 1330 is included within a dashed line. The block-based processing unit 1310 executes computer-executable instructions and may be a real or a virtual processor. In a multi-processing system, multiple processing units execute computer-executable instructions to increase processing power and as such, multiple processors can be running simultaneously. The memory 1320 may be volatile memory (e.g., registers, cache, RAM), non-volatile memory (e.g., ROM, EEPROM, flash memory, etc.), or some combination of the two. The memory 1320 stores software 1380, images, and video that can, for example, implement the technologies described herein. A computing environment may have additional features. For example, the computing environment 1300 includes storage 1340, one or more input devices 1350, one or more output devices 1360, and one or more communication connections 1370. An interconnection mechanism (not shown) such as a bus, a controller, or a network, interconnects the components of the computing environment 1300. Typically, operating system software (not shown) provides an operating environment for other software executing in the computing environment 1300, and coordinates activities of the components of the computing environment 1300.

The storage 1340 may be removable or non-removable, and includes magnetic disks, magnetic tapes or cassettes, CD-ROMs, CD-RWs, DVDs, or any other medium which can be used to store information and that can be accessed within the computing environment 1300. The storage 1340 stores instructions for the software 1380, plugin data, and messages, which can be used to implement technologies described herein.

The input device(s) 1350 may be a touch input device, such as a keyboard, keypad, mouse, touch screen display, pen, or trackball, a voice input device, a scanning device, or another device, that provides input to the computing environment 1300. For audio, the input device(s) 1350 may be a sound card or similar device that accepts audio input in analog or digital form, or a CD-ROM reader that provides audio samples to the computing environment 1300. The output device(s) 1360 may be a display, printer, speaker, CD-writer, or another device that provides output from the computing environment 1300.

The communication connection(s) 1370 enable communication over a communication medium (e.g., a connecting network) to another computing entity. The communication medium conveys information such as computer-executable instructions, compressed graphics information, video, or other data in a modulated data signal. The communication connection(s) 1370 are not limited to wired connections (e.g., megabit or gigabit Ethernet, Infiniband, Fibre Channel over electrical or fiber optic connections) but also include wireless technologies (e.g., RF connections via Bluetooth, WiFi (IEEE 802.11a/b/n), WiMax, cellular, satellite, laser, infrared) and other suitable communication connections for providing a network connection for the disclosed agents, bridges, and agent data consumers. In a virtual host environment, the communication(s) connections can be a virtualized network connection provided by the virtual host.

Some embodiments of the disclosed methods can be performed using computer-executable instructions implementing all or a portion of the disclosed technology in a computing cloud 1390. For example, disclosed compilers and/or block-based-processor servers are located in the computing environment 1330, or the disclosed compilers can be executed on servers located in the computing cloud 1390. In some examples, the disclosed compilers execute on traditional central processing units (e.g., RISC or CISC processors).

Computer-readable media are any available media that can be accessed within a computing environment 1300. By way of example, and not limitation, with the computing environment 1300, computer-readable media include memory 1320 and/or storage 1340. As should be readily understood, the term computer-readable storage media includes the media for data storage such as memory 1320 and storage 1340, and not transmission media such as modulated data signals.

XIII. Additional Examples of the Disclosed Technology

Additional examples of the disclosed subject matter are discussed herein in accordance with the examples discussed above.

In one embodiment, a processor includes a block-based processor core for executing an instruction block comprising an instruction header and a plurality of instructions. The block-based processor core includes execution control logic and core state access logic in communication with the execution control logic. The execution control logic is configured to schedule respective instructions of the plurality of instructions for execution in a dynamic order during a default execution mode and to schedule the respective instructions for execution in a static order during a debug mode. The dynamic order is determined during execution of the instruction block and based on when operands of the plurality of the instructions are ready. The static order is determined based on information that is available before the instruction block is executed. The core state access logic is configured to read intermediate states of the block-based processor core and to provide the intermediate states outside of the block-based processor core only during the debug mode. For example, the intermediate states of the processor core may include operand buffers of an instruction window of the block-based processor core.

The static order may be a compiler-generated order or the static order may be different than a compiler-generated order. The static order may be based on a breadth-first traversal of a dependence graph of the instruction block. Where the static order is the same as the compiler-generated order, none of the one or more instructions of the instruction block in the compiler-generated order include target operands to a preceding instruction of the instruction block. Where the static order is different from the compiler-generated order, the execution control logic can be further configured to receive information indicating which instruction of the instruction block to execute. The block-based processor core may also include header decode logic in communication with the execution control logic. The header decode logic can be configured to decode the instruction header of the instruction block, and the debug mode can be initiated in response to decoding an asserted flag of the instruction header.

The processor can be used in a variety of different computing systems. For example, a server computer can include non-volatile memory and/or storage devices; a network connection; memory storing one or more instruction blocks; and the processor including the block-based processor core for executing the instruction blocks. As another example, a device can include a user-interface component; non-volatile memory and/or storage devices; a cellular and/or network connection; memory storing one or more of the instruction blocks; and the processor including the block-based processor for executing the instruction blocks. The user-interface component can include at least one or more of the following: a display, a touchscreen display, a haptic input/output device, a motion sensing input device, and/or a voice input device.

In one embodiment, a method can be used for debugging an instruction block executing on a block-based processor core of a processor. The instruction block includes an instruction block header and a plurality of instructions. The method includes receiving an indication to enter a debug mode of execution for the instruction block. The method includes executing a single instruction of the instruction block in response to receiving an indication to perform a single-step operation. The single instruction is selected in sequence from a static ordering of the plurality of instructions of the instruction block. The method includes outputting intermediate values of the processor core outside of the processor core in response to executing the single instruction during the debug mode of execution.

The indication to enter the debug mode of execution for the instruction block may be encoded in the instruction block header of the instruction block, and the debug mode of execution may be entered in response to decoding the instruction block header. The indication to perform the single-step operation may include a reference to the single instruction. The static ordering of the plurality of instructions may match or be different from a compiler-generated ordering of the instruction block. The static ordering may be generated according to a breadth-first traversal of a dependence graph of the instruction block. The method may further include capturing the intermediate values of the processor core using a non-destructive scan chain. The method may further include presenting the plurality of instructions for display in a display order. The display order may match the static ordering of the plurality of instructions and differ from a compiler-generated ordering of the plurality of instructions.

In one embodiment, a method can be used for compiling instructions targeted for execution by a block-based processor. The method includes receiving instructions of a program. The method includes grouping the instructions into a plurality of instruction blocks targeted for execution on the block-based processor. For a respective instruction block of the plurality of instruction blocks, the method includes ordering instructions of the respective instruction block based at least on an evaluation order of the instructions so that all references to instruction targets of the instructions are forward references. The method includes emitting the plurality of instruction blocks for execution by the block-based processor in a computer-readable memory or storage device. The method includes storing the emitted plurality of instruction blocks in one or more computer-readable storage media or devices.

Ordering the instructions of the respective instruction block may include generating a dependence graph of the instruction block and ordering the instructions based on a breadth-first traversal of the dependence graph. Ordering the instructions of the respective instruction block may include ordering any of the instructions having no references to instruction targets before any of the instructions having references to instruction targets. The method may further include generating an instruction block header for a respective instruction block of the plurality of instruction blocks The instruction block header may include an execution flag for entering a debug mode when the respective instruction block is executed on the block-based processor.

One or more computer-readable storage media may store computer-readable instructions that when executed by a computer cause the computer to perform the method for compiling instructions targeted for execution by a block-based processor. A block-based processor may be configured to execute computer-readable instructions generated by the method.

In view of the many possible embodiments to which the principles of the disclosed subject matter may be applied, it should be recognized that the illustrated embodiments are only preferred examples and should not be taken as limiting the scope of the claims to those preferred examples. Rather, the scope of the claimed subject matter is defined by the following claims. We therefore claim as our invention all that comes within the scope of these claims.

We claim:

1. A processor comprising:
 a plurality of block-based processor cores including a first block-based processor core for executing an instruction block comprising an instruction header and a plurality of instructions, the first block-based processor core comprising:
  execution control logic configured to schedule respective instructions of the plurality of instructions for execution in a dynamic order during a default execution mode and to schedule the respective instructions for execution in a static order during a debug mode, the dynamic order determined during execution of the instruction block and based on when operands of the plurality of the instructions are ready, the static order determined based on information that is available before the instruction block is executed;
core state access logic in communication with the execution control logic, the core state access logic configured to read intermediate states of the block-based processor core and to provide the intermediate states outside of the block-based processor core only during the debug mode; and
a hardware control unit comprising a debug control module coupled to the plurality of block-based processor cores, the debug control module configured to receive the intermediate states from the core state access logic and to update at least one of the intermediate states based on input from a user.

2. The processor of claim 1, wherein the static order is a compiler-generated order.

3. The processor of claim 1, wherein the static order is based on a breadth-first traversal of a dependence graph of the instruction block.

4. The processor of claim 1, wherein the static order is different than a compiler-generated order, and wherein the execution control logic is further configured to receive information indicating which instruction of the instruction block to execute.

5. The processor of claim 1, wherein the intermediate states of the processor core comprise operand buffers of an instruction window of the processor core.

6. The processor of claim 1, further comprising:
header decode logic in communication with the execution control logic, the header decode logic configured to decode the instruction header of the instruction block, and wherein the debug mode is initiated in response to decoding an asserted flag of the instruction header.

7. The processor of claim 1, wherein the intermediate states of the block-based processor core are uncommitted results that are local to the block-based processor core.

8. A method of executing a first instruction block, comprising a first instruction block header and a first plurality of instructions, on a first block-based processor core, and executing a second instruction block, comprising a second instruction block header and a second plurality of instructions, on a second block-based processor core, the method comprising:
scheduling the first plurality of instructions for execution in a dynamic order during a default execution mode, the dynamic order determined during execution of the first instruction block and based on when operands of the first plurality of the instructions are ready;
determining, by a debug control module of a hardware control unit shared between the first and second block-based processor cores and based on information that is available before the second instruction block is executed, a static order for execution of the second plurality of instructions, the static order differing from a compiler-generated order for execution of the second plurality of instructions;
scheduling the plurality of instructions of the second instruction block for execution in the static order during a debug mode;
reading intermediate states of the second block-based processor core; and
providing the intermediate states outside of the second block-based processor core to the debug control module.

9. The method of claim 8, wherein the static order is based on a breadth-first traversal of a dependence graph of the second instruction block.

10. The method of claim 8, wherein the method further comprises:
receiving, at the second block-based processor core, from the debug control module, information indicating which instruction of the second instruction block to execute.

11. The method of claim 8, wherein the intermediate states of the processor core comprise operand buffers of an instruction window of the second block-based processor core.

12. The method of claim 8, further comprising:
decoding the second instruction block header, and
initiating the debug mode in response to decoding an asserted flag of the second instruction block header.

13. The method of claim 8, wherein the intermediate states of the second block-based processor core are uncommitted results that are local to the second block-based processor core.

14. One or more computer-readable non-volatile storage devices or memory components storing computer-readable instructions that when executed by an apparatus comprising a block-based processor core, cause the apparatus to perform a method, the computer-readable instructions comprising:
first instructions to receive an instruction block comprising an instruction header and a plurality of program instructions;
second instructions to schedule the plurality of program instructions for execution in a dynamic order during a default execution mode, the dynamic order determined during execution of the instruction block and based on when operands of the plurality of program instructions are ready;
third instructions to schedule the plurality of program instructions for execution in a static order during a debug mode, the static order determined based on information that is available before the instruction block is executed;
fourth instructions to read intermediate states of the block-based processor core; and
fifth instructions to provide the intermediate states outside of the block-based processor core, to a debug control module of a hardware control unit shared between the block-based processor core and another block-based processor core, only during the debug mode, wherein the intermediate states are not visible to the another block-based processor core.

15. The one or more computer-readable non-volatile storage devices or memory components of claim 14, wherein the static order is a compiler-generated order.

16. The one or more computer-readable non-volatile storage devices or memory components of claim 14, wherein the static order is based on a breadth-first traversal of a dependence graph of the instruction block.

17. The one or more computer-readable non-volatile storage devices or memory components of claim 14, wherein the static order is different than a compiler-generated order for execution of the plurality of program instructions, and wherein the computer-readable instructions further comprise:
sixth instructions to receive information indicating which program instruction of the instruction block to execute.

18. The one or more computer-readable non-volatile storage devices or memory components of claim 14, wherein the intermediate states of the block-based processor core comprise operand buffers of an instruction window of the block-based processor core.

* * * * *